United States Patent
Ishikawa et al.

(10) Patent No.: US 7,384,368 B2
(45) Date of Patent: Jun. 10, 2008

(54) TOROIDAL-TYPE CONTINUOUSLY VARIABLE TRANSMISSION

(75) Inventors: Kouji Ishikawa, Kanagawa (JP); Hiroshi Kato, Kanagawa (JP); Eiji Inoue, Kanagawa (JP); Hiroki Nishii, Kanagawa (JP)

(73) Assignee: NSK Ltd., Tokyo (JP)

( * ) Notice: Subject to any disclaimer, the term of this patent is extended or adjusted under 35 U.S.C. 154(b) by 659 days.

(21) Appl. No.: 10/820,787

(22) Filed: Apr. 9, 2004

(65) Prior Publication Data
US 2005/0014598 A1    Jan. 20, 2005

(30) Foreign Application Priority Data
Apr. 11, 2003  (JP) ............................. 2003-107826
Dec. 15, 2003  (JP) ............................. 2003-416982

(51) Int. Cl.
*F16H 57/04*    (2006.01)

(52) U.S. Cl. ............................ 476/8; 476/40; 476/46; 384/443; 184/6.21

(58) Field of Classification Search ................ 476/8, 476/40, 42, 46; 384/443, 473; 184/6.21, 184/6.24, 6.25
See application file for complete search history.

(56) References Cited
U.S. PATENT DOCUMENTS 2,885,081 A * 5/1959 Stem ........................ 210/222
5,965,018 A * 10/1999 Caiozza ..................... 210/222
6,207,050 B1 * 3/2001 Holifield .................... 210/223
6,238,318 B1   5/2001 Itoh et al.
7,220,359 B2 * 5/2007 Leimann .................... 210/695

FOREIGN PATENT DOCUMENTS

| JP | 62-266265 A | 11/1987 |
| JP | 8-35552 A | 2/1996 |
| JP | 11-153203 A | 6/1999 |
| JP | 2002-286110 A | 10/2002 |

* cited by examiner

*Primary Examiner*—David M Fenstermacher
(74) *Attorney, Agent, or Firm*—Sughrue Mion, PLLC

(57) ABSTRACT

A toroidal-type continuously variable transmission includes an input shaft, an input disk and an output disk, plural power rollers, a power roller bearing, an oil passage, and a mesh filter. The input and output disks are supported mutually concentrically with the input shaft and mutually independently rotatably. The plural power rollers are sandwiched between the input disk and the output disks. The power roller bearing rotatably supports the power rollers. The oil passage for leading lubricating oil to the power roller bearing. The mesh filter is provided in the oil passage. Accordingly, the toroidal-type continuously variable transmission can prevent an occurrence of biting-in of foreign substances at a power roller bearing, to thereby increase the life of the power roller bearing.

16 Claims, 24 Drawing Sheets

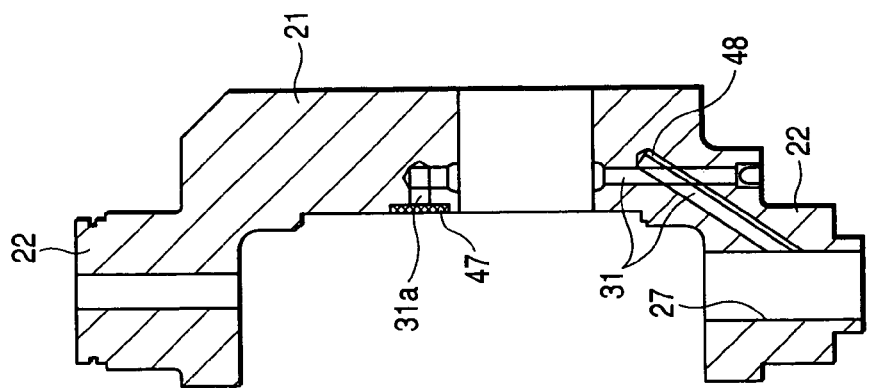
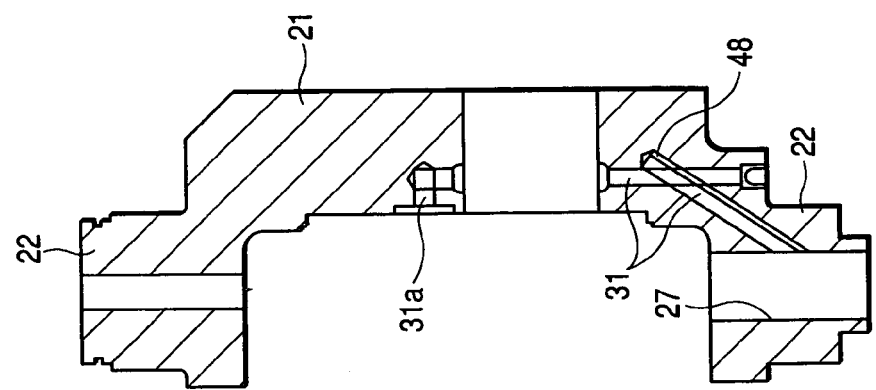
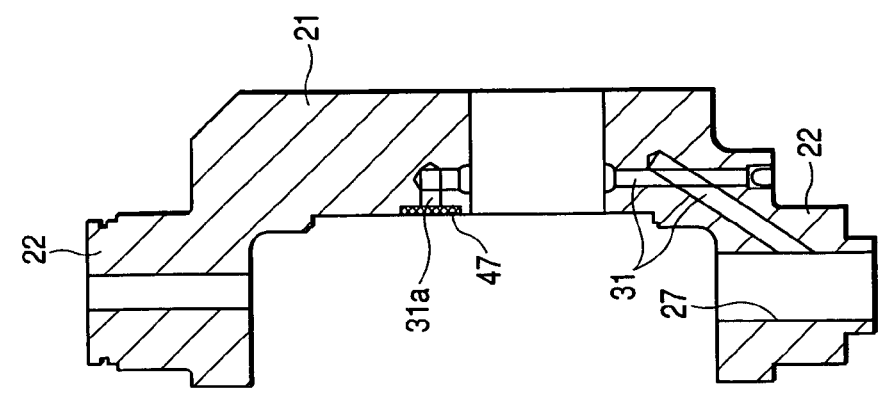

TOROIDAL-TYPE CONTINUOUSLY VARIABLE TRANSMISSION

BACKGROUND OF THE INVENTION

The present invention relates to a toroidal-type continuously variable transmission to be used as, for example, an automotive transmission.

A related toroidal-type continuously variable transmission to be used as, for example, an automotive transmission is configured as illustrated in FIGS. 11 and 12. That is, an input disk 2 and an output disk 3 are rotatably supported on an input shaft 1, which is connected to a drive source (not shown) such as an engine, through a needle roller bearing. A cam plate 4 is spline-engaged with the input shaft 1 on the back-surface side of the input disk 2. A roller 5 is interposed between the cam plate 4 and the input disk 2. A loading cam or hydraulic loading pressing mechanism 6 for pressing the input disk 2 against an output disk 3 is provided therebetween.

Trunnions 8a and 8b each swinging about a pivot shaft 7 are provided between the input disk 2 and the output disk 3. A displacement shaft 9 is provided in each of the trunnions 8a and 8b through a radial needle roller bearing 8. A power roller 10 is rotatably supported on each of the displacement shafts 9 through an associated needle roller bearing 9a. Each of these power rollers 10 has a traction portion contacting the input disk 2 and the output disk 3 and is rolling-contacted therebetween in such a way as to tiltably rotate.

A power roller bearing 11 is provided between the power roller 10 and each of the trunnions 8a and 8b. This power roller bearing 11 allows the power roller 10 to rotate, while supporting a thrust load applied to the power roller 10. A plurality of balls 12 of such a power roller bearing 11 are held by an annular retainer 14 provided between an annular outer ring 13, which is provided at the side of each of the trunnions 8a and 8b, and the power roller 10 serving as a rotary portion. A radial bearing 16 is provided on a yoke 15 for tiltingly rotatably supporting each of the trunnions 8a and 8b, which supports the pivot shaft 7.

A valve body is placed under the input disk and the output disk. A mechanism for controlling a height position of the power roller is built into this valve body. This mechanism comprises an actuator, a hydraulic control valve for driving this actuator, and so on.

In the toroidal-type continuously variable transmission, power is transmitted between the power roller and each of the input disk and the output disk by interposing an oil film therebetween and using a shearing force of this oil film so as to secure traction. There are known techniques of thus providing a lubricating system in a toroidal-type continuously variable transmission, in which lubricating oil collected and stored in an oil pan is sucked up by an engine-driven oil pump having a line filter provided at the suction side thereof, and in which the lubricating oil is then supplied to the traction surfaces of an input disk and an output disk, and also a traction surface of a power roller through oil passages provided in drive rods of trunnions, (see, for example, the U.S. Pat. No. 6,238,318 and JP-A-2002-286110).

As described above, foreign substances, whose sizes are equal to or more than a predetermined size, can be eliminated by providing the line filter at the suction side of the oil pump. However, in a case where foreign substances unremoved by the line filter or burrs remain in the oil passage from the line filter to an oil passage outlet, or where dust enters there during fabrication of the transmission, foreign substances blow off to the power roller together with the lubricating oil.

The power roller bearing of the toroidal-type continuously variable transmission is used especially under a high bearing pressure at a high revolution rate. Thus, the related toroidal-type continuously variable transmission has a drawback in that such biting-in of foreign substances decreases the life of the power roller bearing.

SUMMARY OF THE INVENTION

The present invention is accomplished in view of the aforementioned circumstances. Accordingly, an object of the invention is to provide a toroidal-type continuously variable transmission enabled to prevent an occurrence of biting-in of foreign substances at a power roller bearing to thereby increase the life of the power roller bearing.

To achieve the foregoing object, according to an aspect of the invention, there is provided a toroidal-type continuously variable transmission that comprises an input shaft, an input disk and an output disk, which are supported mutually concentrically with the input shaft and mutually independently rotatably, plural power rollers sandwiched between the input disk and the output disk, a power roller bearing for rotatably supporting the power rollers, an oil passage for leading lubricating oil to the power roller bearing, and a mesh filter and a magnet member provided in the oil passage.

According to another aspect of the invention, there is provided a toroidal-type continuously variable transmission that comprises an input shaft, an input disk and an output disk, which are supported mutually concentrically with the input shaft and mutually independently rotatably, plural power rollers sandwiched between the input disk and the output disk, a power roller bearing for rotatably supporting the power rollers, an oil passage for leading lubricating oil to the power roller bearing, and a mesh filter and a magnet member provided in the oil passage.

Preferably, the toroidal-type continuously variable transmission according to the invention includes a seal member provided on the outer peripheral surface of the power roller bearing.

Preferably, the toroidal-type continuously variable transmission according to the invention includes a mesh member and a magnet member is provided in the oil passage.

Preferably, the toroidal-type continuously variable transmission according to the invention includes a seal member provided on the outer peripheral surface of the power roller bearing, and a mesh member and a magnet member provided in the oil passage.

According to the invention, foreign substances passing through the line filter and dust, burrs, iron powder and so on, which remain at the midway of the oil passage, can be removed by providing a mesh filter and/or a magnet member, which are used for trapping foreign substances, in a part between the line filter and the oil passage for supplying lubricating oil to the power roller bearing. Consequently, the invention can prevent foreign substances from blowing off to the power roller together with lubricating oil.

BRIEF DESCRIPTION OF THE DRAWINGS

In FIG. 3.

FIG. 4A shows a third embodiment of the invention and is a longitudinally sectional side view illustrating a trunnion of the third embodiment, and FIGS. 4B and 4C are longitudinally sectional side views each illustrating a modification of the third embodiment;

DETAILED DESCRIPTION OF THE PREFERRED EMBODIMENTS

Hereinafter, embodiments of the invention are described with reference to the accompanying drawings.

Figure 1:
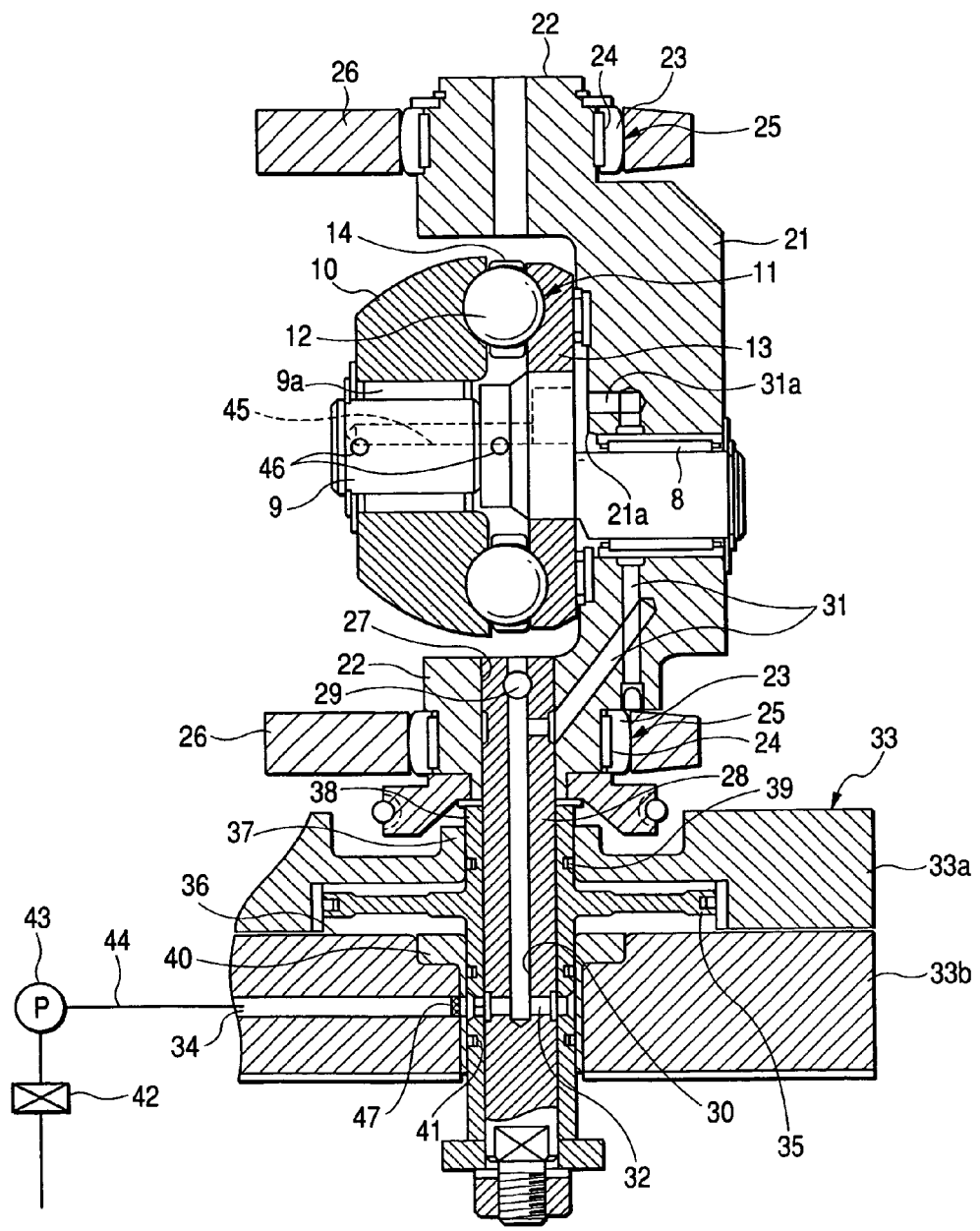
FIG. 1 shows a first embodiment of the invention and is a longitudinally sectional side view illustrating a trunnion of the first embodiment.
Figure 2A:
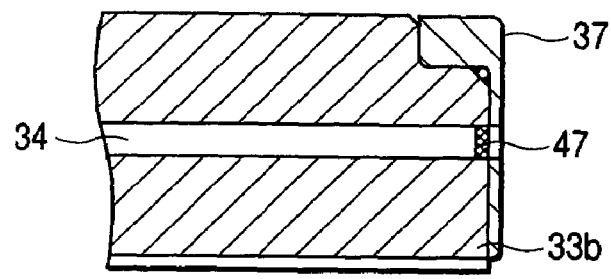
FIG. 2A is an enlarged longitudinally sectional side view illustrating a valve body of the first embodiment.
Figure 2B:
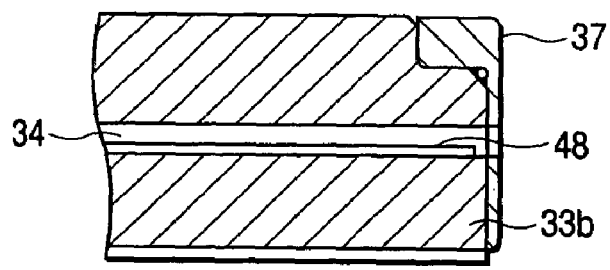
FIGS. 2B and 2C are longitudinally sectional side views each illustrating a modification of the first embodiment.
Figure 2C:
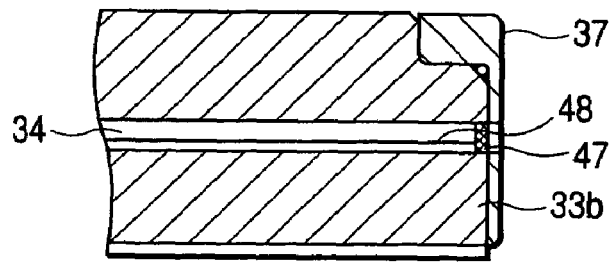

FIGS. 1 and 2A to 2C show a first embodiment of the invention. FIG. 1 is a longitudinally sectional side view illustrating a trunnion of the first embodiment. FIGS. 2A to 2C are enlarged longitudinally sectional side views each illustrating a valve body. Incidentally, the same constituent parts as those of the related toroidal-type continuously variable transmission are designated by the same reference characters. Thus, the description thereof is omitted herein.

As shown in FIG. 1, paired pivot shafts 22, which are disposed concentrically with each other, are provided in both end portions of a trunnion 21. An outer ring 23 is placed around these pivot shafts 22 concentrically therewith. Radial needle roller bearings 25 are configured by rollably providing a plurality of needle rollers 24 between the inner circumferential surface of the outer ring 23 and the outer circumferential surface of each of the pivot shafts 22. Each of the pivot shafts 22 of the trunnion 21 is rotatably supported through the radial needle roller bearing 25 by a yoke 26 serving as a trunnion support member.

A fixing hole 27 extending in an axial direction is provided in the bottom portion of the pivot shaft 22. The top portion of a drive rod 28 is inserted into this fixing hole 27. The drive rod 28 is integrally connected to the pivot shaft 22 through a pin 29 penetrating therethrough in a direction perpendicular to the axial direction.

An oil passage 30 is provided in the shaft center of the drive rod 28 in such a way as to axially pass therethrough. The top portion of this oil passage 30 communicates with an oil passage 31 provided in the trunnion 21, so that the lubricating oil is supplied to a radial needle roller bearing 8 and a power roller bearing 11. The bottom portion of this oil passage 30 communicates with an oil passage 34 in a valve body 33 through a through hole 32 radially penetrating through the drive rod 28.

A hydraulic piston 35 is provided at the bottom portion of the drive rod 28. The valve body 33 is divided into an upper valve body 33a and a lower valve body 33b. A drive cylinder 36 for accommodating the hydraulic piston 35 is provided along a dividing plane therebetween. An upper part of the drive cylinder 36 communicates with the inner space of a guide barrel 37 provided in the upper valve body 33a. The space between the inner circumferential surface of this guide barrel 37 and a boss portion 38 of the hydraulic piston 35 is sealed with a sealant 39. A lower part of the drive cylinder 36 communicates with the inner space of a guide barrel 40 provided in the lower valve body 33b. The space between the inner circumferential surface of this guide barrel 40 and a boss portion 38 of the hydraulic piston 35 is sealed with a sealant 41.

The oil passage 34 provided in the valve body 33 communicates with an engine-driven oil pump 43, which has a line filter 42 provided at the suction side thereof, through piping 44. The lubricating oil is then pressure-fed to the passages 34, 30, and 31, which serve as lubricating systems, by the oil pump 43 in this order. Thus, the lubricating oil is supplied to the radial needle roller bearing 8 and the power roller bearing 11 of the power roller 12. Also, the lubricating oil is supplied to the traction surfaces of the input disk 2, the output disk 3, and the power roller 10.

An oil passage outlet 31a of the oil passage 31 provided in the trunnion 21 is opened in an inner surface 21a of the trunnion 21. A cavity portion 45 is provided in the displacement shaft 9, which faces this oil passage outlet 31a, eccentrically with the shaft center thereof in such a way as to axially extend. An oil supply port 46 opened in the outer circumferential surface of the displacement shaft 9 is provided in this cavity portion 45. The lubricating oil supplied to the cavity portion 45 from the oil passage outlet 31a is supplied to the power roller bearing 11 and the needle roller bearing 9a from the oil supply port 46.

As shown in FIG. 2A, a mesh filter 47 for trapping foreign substances having passed through the line filter and also trapping dust, burrs, iron powder and so on, which remain at the midway of the oil passage 34, is provided at a place close to the discharge side of the oil passage 34 of the lower valve body 33b, that is, to the guide barrel 37. In consideration of the life of the power roller bearing 11, the fluidity of the lubricating oil, and the clogging of the mesh filter 47, preferably, the mesh size of the mesh filter 47 is 50 μm to 200 μm.

FIG. 2B shows a first modification of the first embodiment. One or plural magnet members 48 are provided along the bottom of the inner space of the oil passage 34 formed in the lower valve body 33b. This magnet member 48 can adsorb burrs and ferrous foreign substances and also can reduce foreign materials in the lubricating oil.

FIG. 2C shows a second modification of the first embodiment. A mesh filter 47 for trapping foreign substances having passed through the line filter 42 and also trapping dust, burrs, iron powder and so on, which remain at the midway of the oil passage 34, is provided at a place close to the discharge side of the oil passage 34 of the lower valve body 33b, that is, to the guide barrel 37. Also, a magnet member 48 is provided along the bottom of the inner space of the oil passage 34.

When lubricating oil is pressure-fed through piping 44 by the engine-driven oil pump 43 having the line filter 42, the lubricating oil is led to the oil passages 34, 30, and 31 of the lower valve body 33b in this order. At that time, foreign substances, such as dust, burrs, iron powder and so on, which remain at the midway of the oil passage 34, 30 and 31, are trapped by the mesh filter 47 or the magnet member 48. Thus, the foreign substances are not supplied to the radial needle roller bearing 8 and traction surfaces of the power roller bearing 11 of the power roller 12, the input disk 2, the output disk 3, and the power roller 10, together with the lubricating oil. Consequently, an occurrence of the biting of foreign substances into the power roller bearing 11 and so on can be prevented. Thus, the life of the power roller bearing 11 and so on can be lengthened.

Figure 3A:
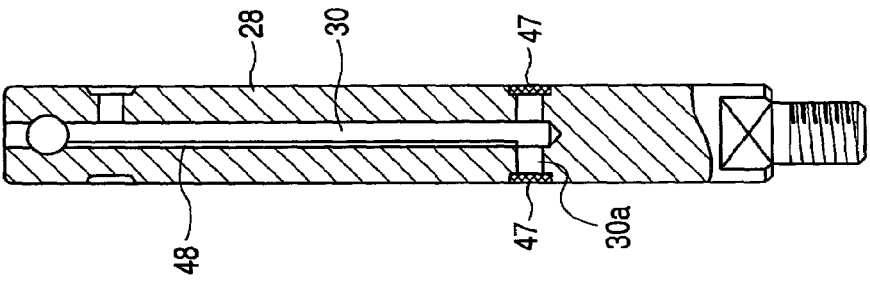
FIG. 3A shows a second embodiment of the invention and is a longitudinally sectional side view illustrating a drive rod of the second embodiment and FIGS. 3B and 3C are longitudinally sectional side views each illustrating a modification of the second embodiment.

FIG. 3A shows a second embodiment of the invention, in which a mesh filter 47 similar to that of the first embodiment is installed at an inlet 30a of the oil passage 30 provided in such a way as to extend in the axial direction of the drive rod 28.

Figure 3B:
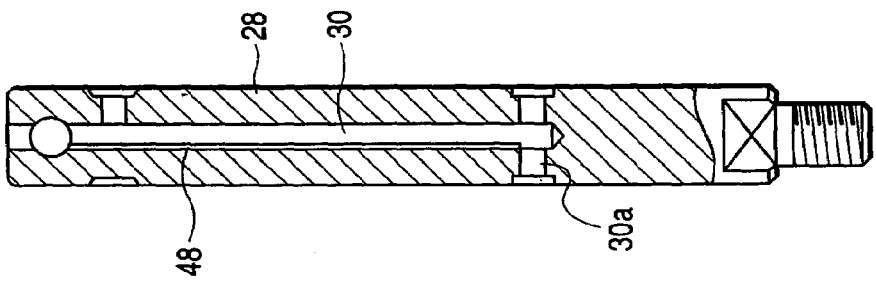

FIG. 3B shows a first modification of the second embodiment. In the oil passage 30 in such a way as to extend in the axial direction of the drive rod 28, one or plural magnet members 48 similar to those of the first embodiment are provided.

Figure 3C:
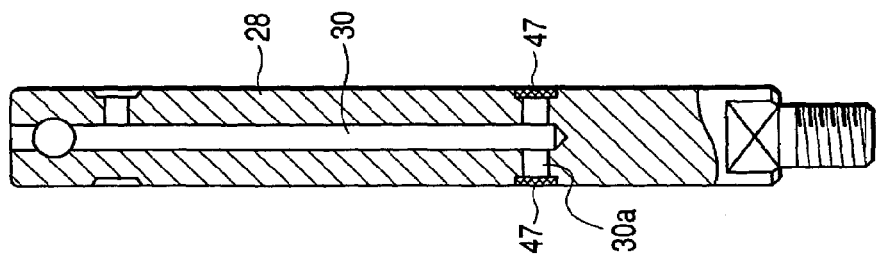

FIG. 3C shows a second modification of the second embodiment. At the inlet 30a of the oil passage 30 provided in such a way as to extend in the axial direction of the drive rod 28, a mesh filter 47 similar to that of the first embodiment is provided. Also, in the oil passage 30 in such a way as to extend in the axial direction of the drive rod 28, one or more magnet members 48 similar to those of the first embodiment are provided.

FIG. 4A shows a third embodiment of the invention, in which a mesh filter 47 similar to that of the first embodiment is installed at an outlet 30a of the oil passage 31 provided in the trunnion 21.

FIG. 4B shows a first modification of the third embodiment of the invention, in which one or more magnet members 48 similar to those of the first embodiment is installed at an outlet 30a of the oil passage 31 provided in the trunnion 21.

FIG. 4C shows a second modification of the third embodiment of the invention. At an outlet 31a of the oil passage 31 provided in the trunnion 21, a mesh filter 47 similar to that of the first embodiment is provided. Also, in the oil passage 31 provided in the trunnion 21, one or more magnet members 48 similar to those of the first embodiment are provided.

Figure 5A:
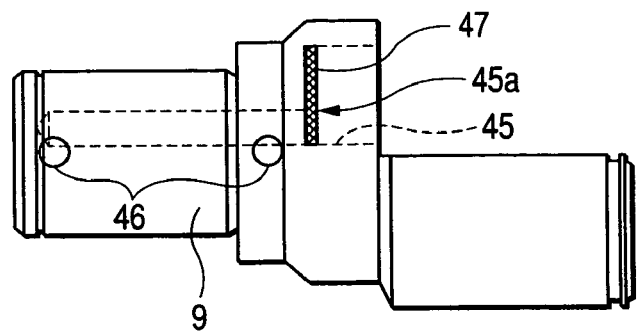
FIG. 5A shows a fourth embodiment of the invention and is a longitudinally sectional side view illustrating a displacement shaft of the fourth embodiment.

FIG. 5A shows a fourth embodiment of the invention, in which a mesh filter 47 similar to that of the first embodiment is provided at an entrance 45a of a cavity portion 45 of the displacement shaft 9.

Figure 5B:
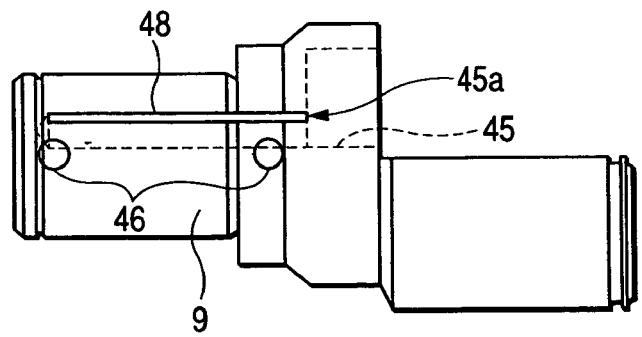
FIGS. 5B and 5C are longitudinally sectional side views each illustrating a modification of the fourth embodiment.

FIG. 5B shows a first modification of the fourth embodiment. In the cavity portion 45 of the displacement shaft 9, one or more magnet members 48 similar to those of the first embodiment are provided.

Figure 5C:
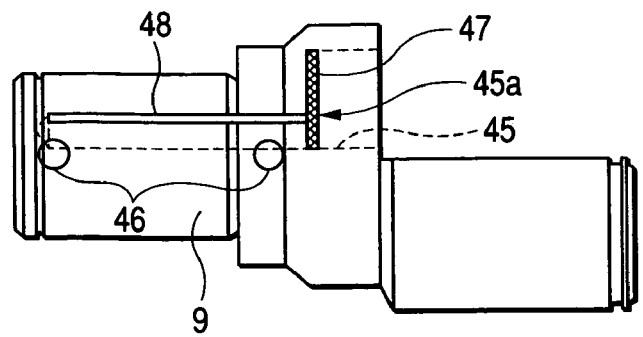

FIG. 5C shows a second modification of the fourth embodiment. In the entrance 45a of the cavity portion 45 of the displacement shaft 9, one or more magnet members 48 similar to those of the first embodiment are provided. Also, in the cavity portion 45 of the displacement shaft 9, one or more magnet members 48 similar to those of the first embodiment are provided.

Figure 6:
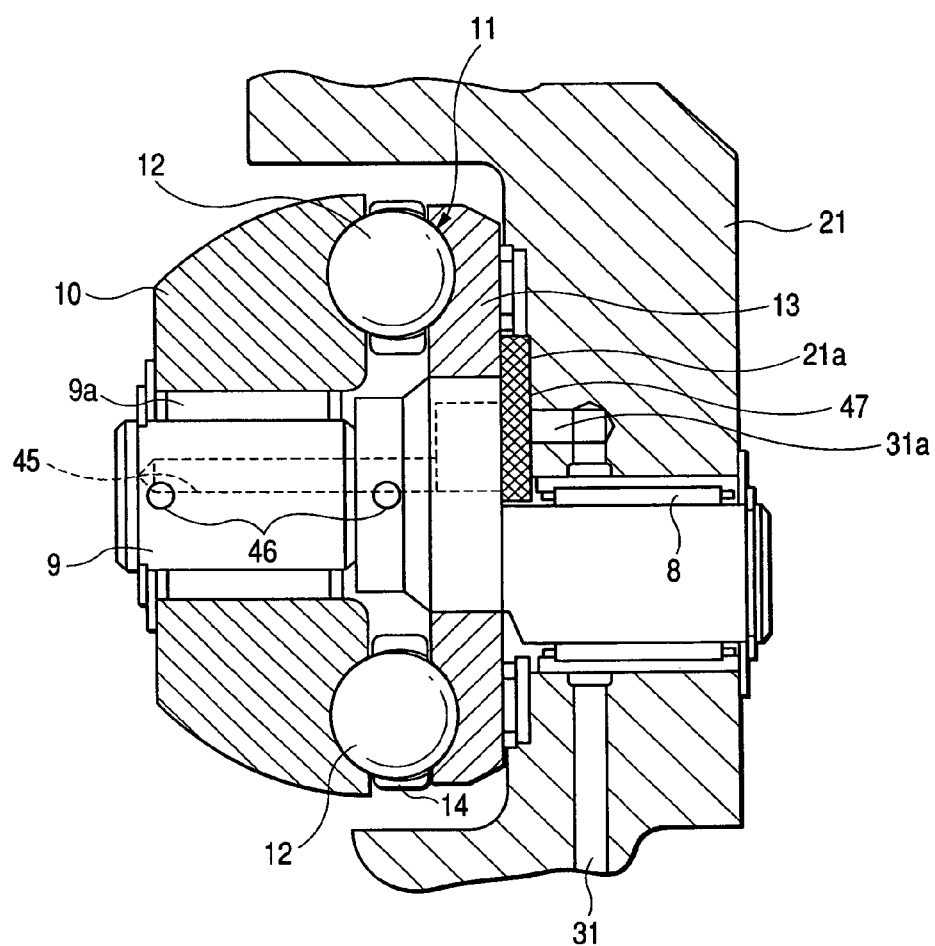
FIG. 6 shows a fifth embodiment of the invention and is a longitudinally sectional side view illustrating a trunnion and a power roller of the fifth embodiment.

FIG. 6 shows a fifth embodiment. A mesh filter 47 similar to that of the first embodiment is provided between the inner surface 21a of the trunnion 21 and the back surface of the power roller 10 in such a manner as to face the oil passage outlet 31a of the oil passage 31 provided in the trunnion 21.

Figure 7A:
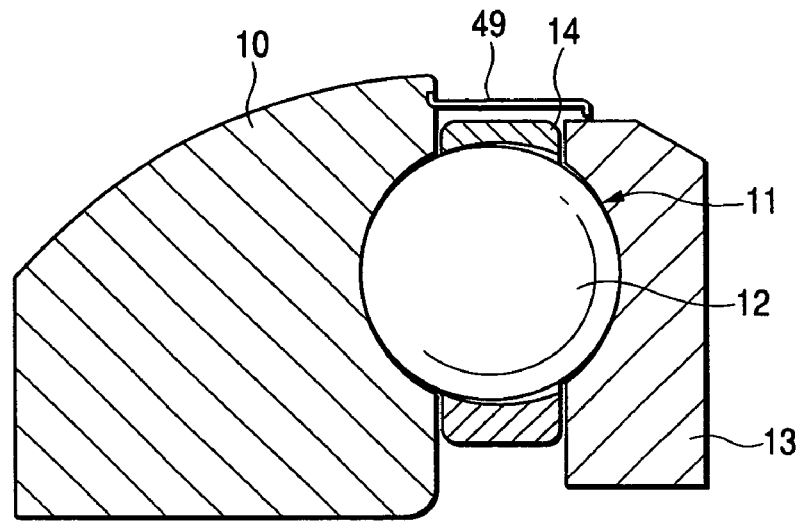
FIG. 7A shows a sixth embodiment of the invention and is a longitudinally sectional side view partly illustrating a power roller of the sixth embodiment.

FIG. 7A shows a sixth embodiment of the invention. A seal member 49 is provided on an outer periphery of the power roller bearing 11. This seal member 49 is annular and has an end portion fixed to the power roller 10, and also has the other end portion lapped around the outer periphery of the outer ring 13. This seal member 49 can prevent foreign substances, which are gathered up into the lubricating oil, from falling and getting mixed into the lubricating oil when the power roller bearing 11 stops rotating. During rotation of the power roller bearing 11, foreign materials do not enter the power roller bearing 11, because the lubricating oil is scattered from the inside of the power roller bearing 11 to the outside by a centrifugal force. However, even when the rotation of the power roller bearing 11 is stopped, lubricating oil is supplied thereto. At that time, foreign materials may enter the power roller bearing 11 from the outside. However, as described above, foreign materials can be prevented by covering the outer periphery of the power roller bearing 11 with seal member 49 from entering there.

Figure 7B:
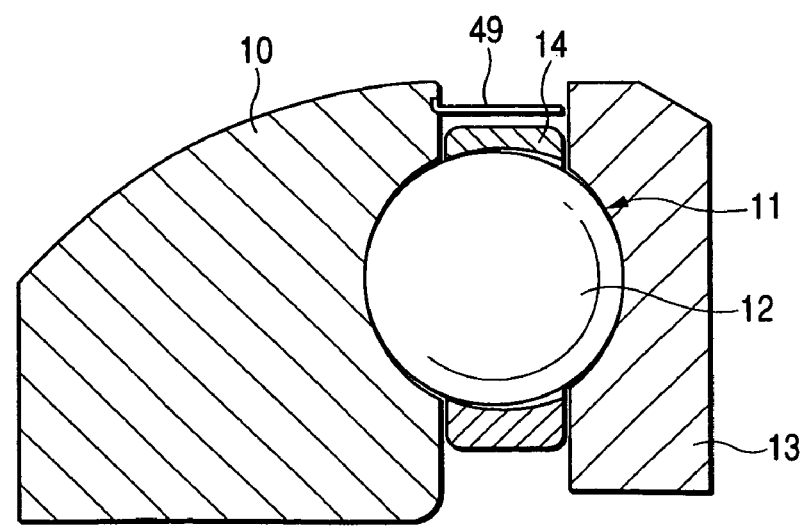
FIG. 7B is a longitudinally sectional side view illustrating a modification of the sixth embodiment.

FIG. 7B shows a modification of the sixth embodiment. A seal member 49 is provided on the outer periphery of the power roller bearing 11. This seal member 49 is similar to that of the sixth embodiment, and has an end portion fixed to the power roller 10 and also has the other end portion provided close to an end surface of the outer ring 13.

Incidentally, although the seal member 49 has been described in the description of the sixth embodiment, a modification thereof having a combination of this seal member 49 with the mesh filter 47 and the magnet member 48, which are used in each of the first to fifth embodiments, is more effective.

Figure 8:
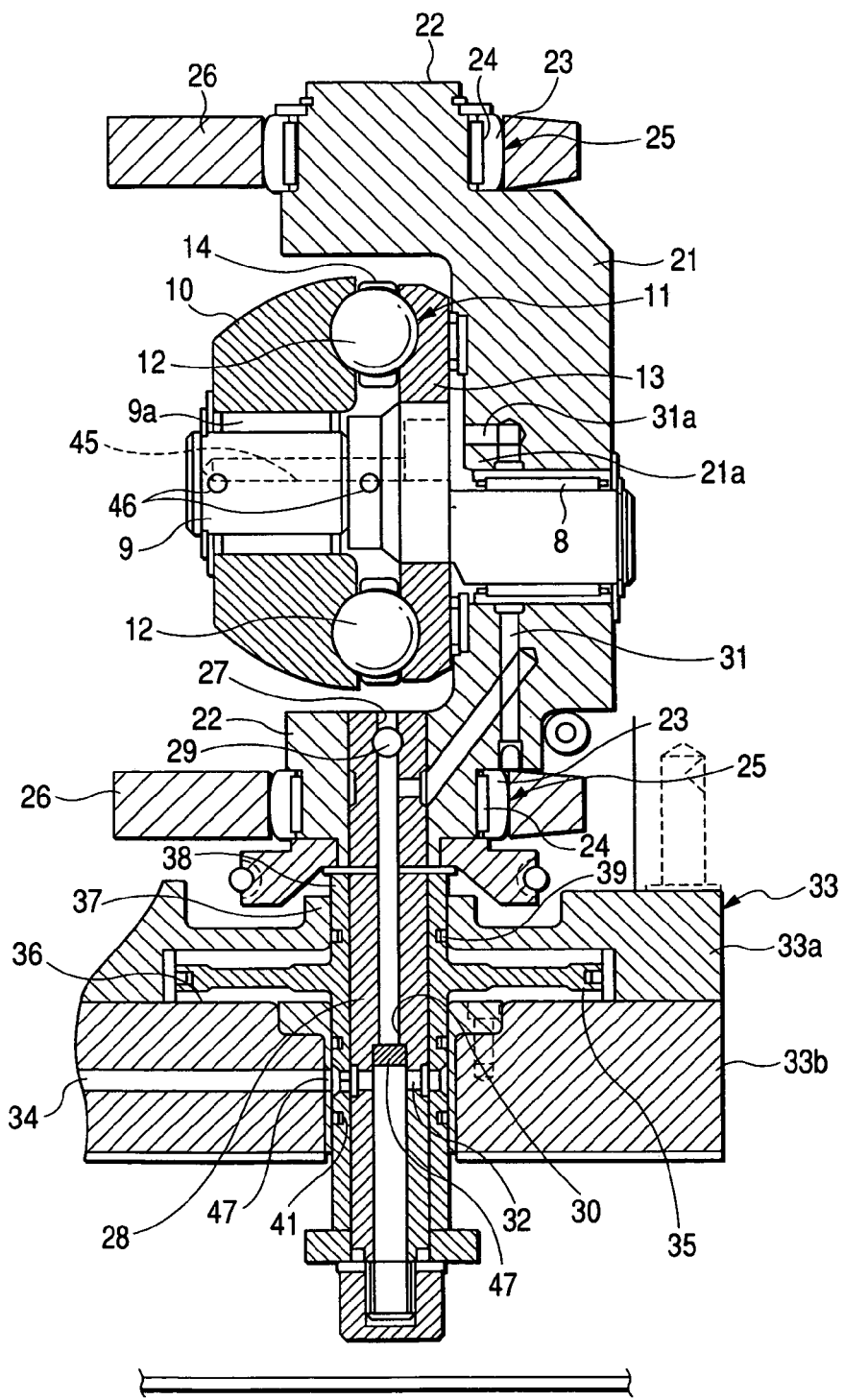
FIG. 8 shows a seventh embodiment of the invention and is a longitudinally sectional side view illustrating a trunnion of the seventh embodiment.

FIG. 8 shows a seventh embodiment of the invention. A mesh filter 47 similar to that provided in each of the first to sixth embodiments is provided at the midway of the oil passage 30 of a shaft provided at the bottom of the trunnion 21, that is, the drive rod 28. Thus, burrs or the like produced at the boring of a hole in the drive rod 28 provided at the bottom of the trunnion 21 are not carried to the power roller bearing 11. Consequently, the lengthening of the life of the power roller bearing 11 can be achieved.

Figure 9:
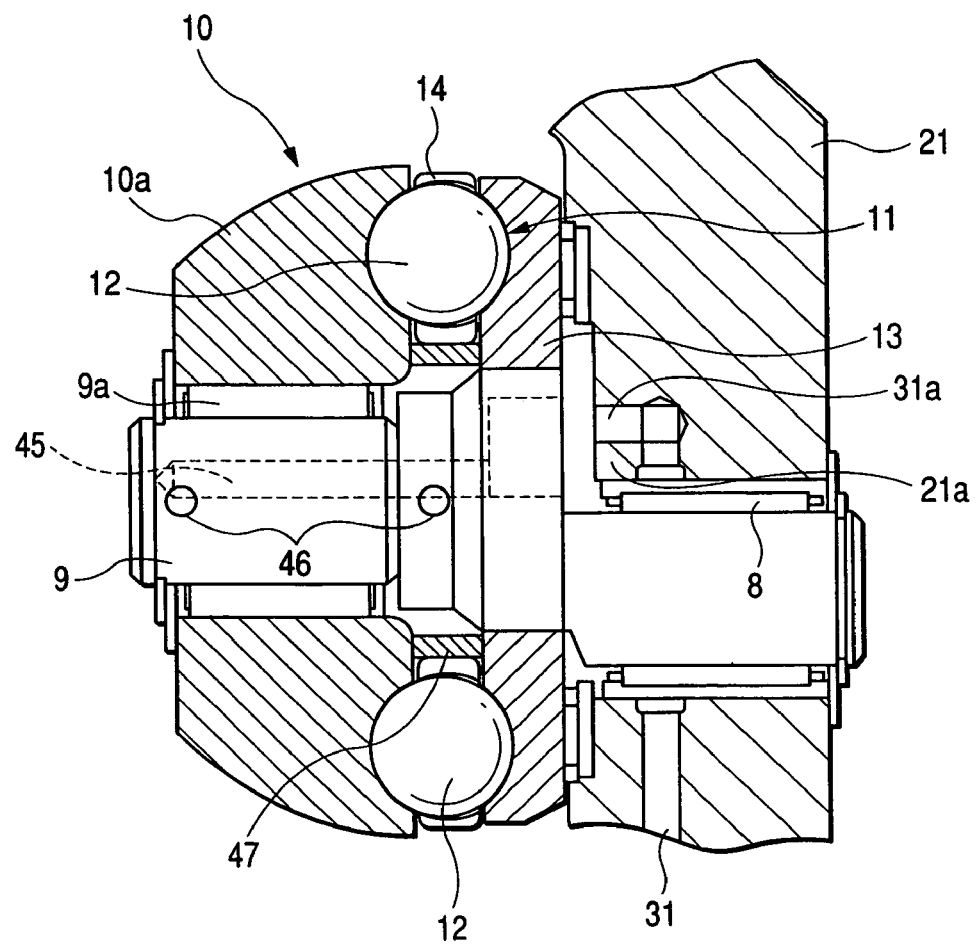
FIG. 9 shows an eighth embodiment of the invention and is a longitudinally sectional side view illustrating a peripheral part of a power roller of the eighth embodiment.

FIG. 9 shows an eighth embodiment of the invention. A mesh filter 47 similar to that of each of the first to seventh embodiments is provided between an inner ring 10a and the outer ring 13 of the power roller 10 in such a way as to surround the displacement shaft 9. Thus, foreign substances can be prevented from entering between a ball 12 of the power roller-bearing 11 and a rolling surface thereof. Consequently, the lengthening of the life of the power roller bearing 11 can be achieved.

Figure 10:
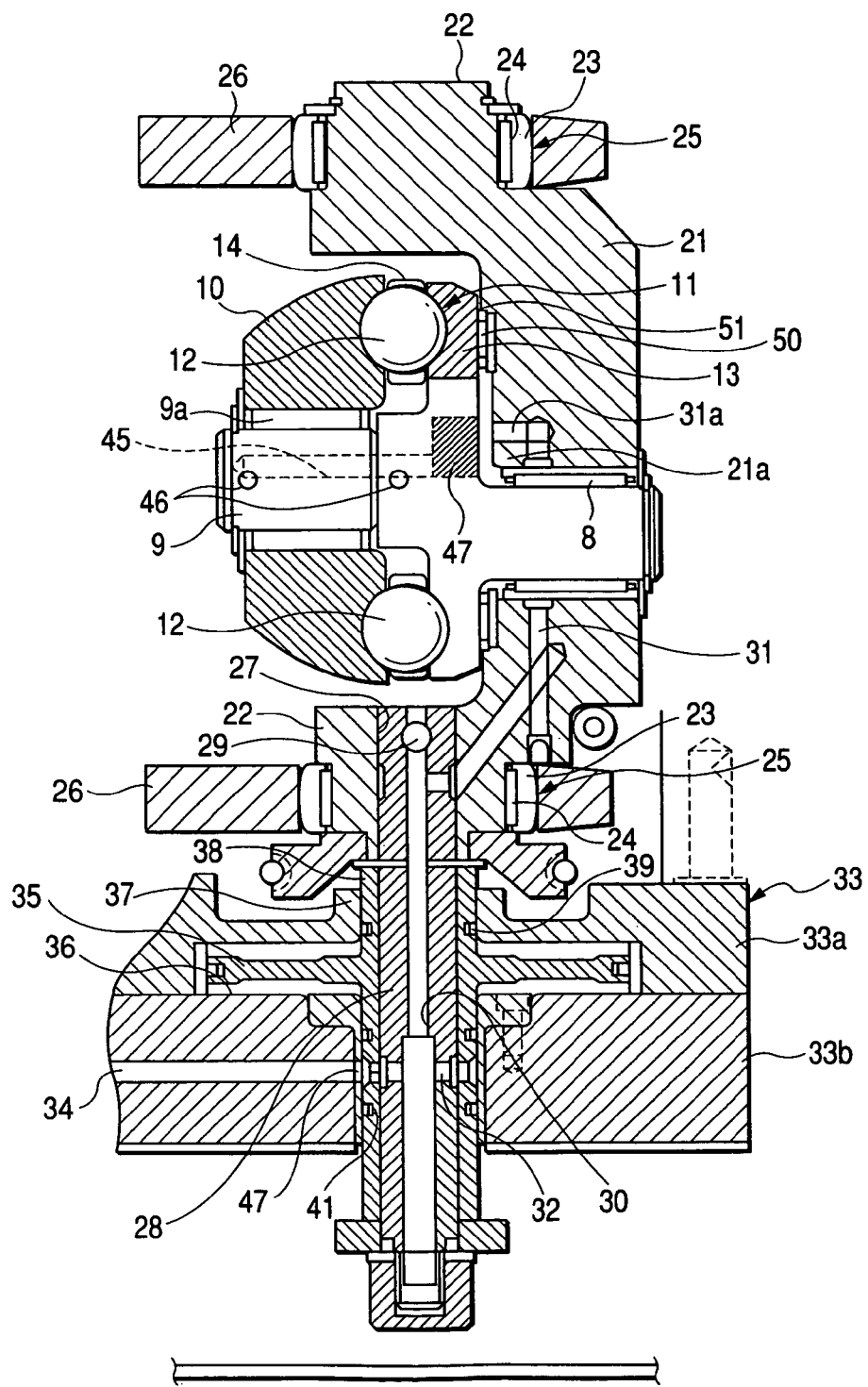
FIG. 10 shows a ninth embodiment of the invention and is a longitudinally sectional side view illustrating a trunnion of the ninth embodiment.
Figure 11:
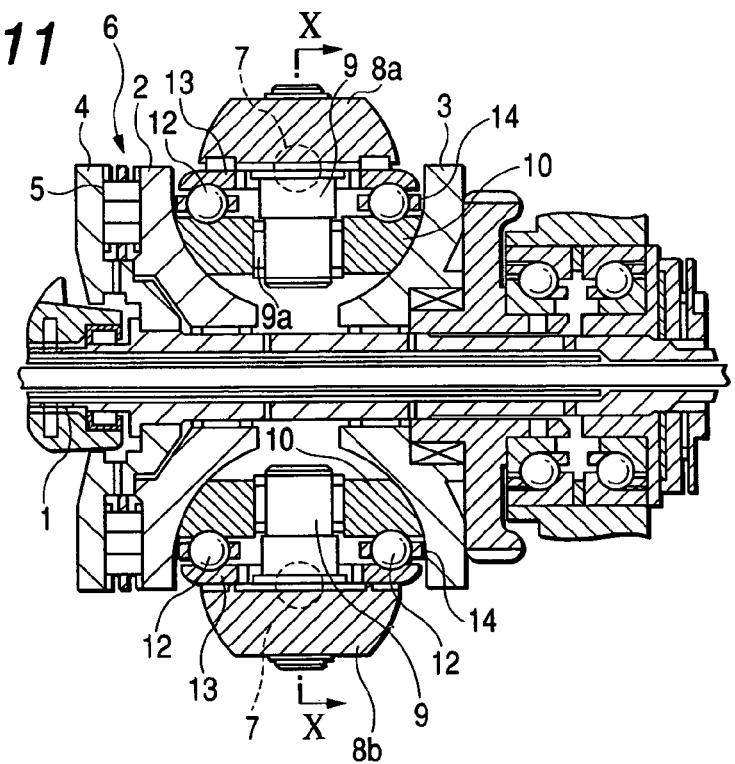
FIG. 11 is a longitudinally sectional side view illustrating a related toroidal-type continuously variable transmission.
Figure 12:
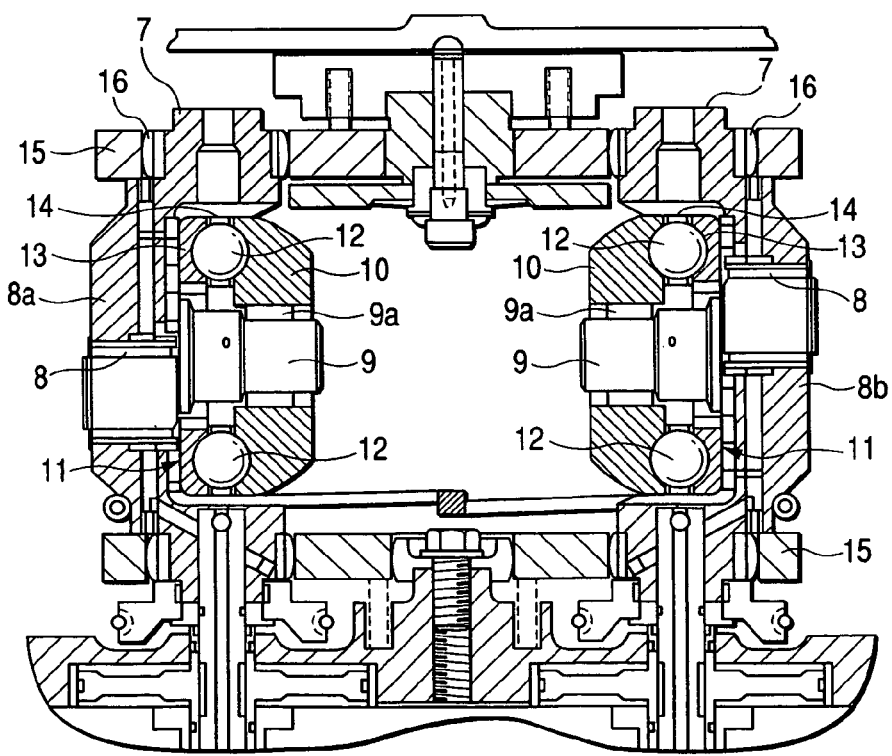
FIG. 12 is a sectional view taken along line X-X of FIG. 11.

FIG. 10 shows a ninth embodiment of the invention. The outer ring 13 of the power roller 10 and the displacement shaft 9 are integrally formed. A mesh filter 47 similar to that of the first to eighth embodiments is provided in the cavity portion 45 of the displacement shaft 9. Usually, when the outer ring 13 is inserted into the displacement shaft 9, lubricating oil may flow from the gap therebetween. However, in the case that the outer ring 13 and the displacement shaft 9 of the ninth embodiment are integrally formed, lubricating oil flows only from the cavity portion 45. Because the mesh filter 47 is provided in this cavity portion 45, contaminants can be surely eliminated. Also, in this embodiment, a seal member 51 is provided on the outer peripheral portion of a thrust bearing 50 that is disposed between the trunnion 21 and the outer ring 13 of the power roller 10. Therefore, the lubricating oil can be prevented from flowing from the thrust bearing 50 in a case where the cavity portion 45 is clogged with contaminants, and where the lubricating oil becomes difficult to flow.

Incidentally, the invention is not limited to the aforementioned embodiments themselves. In an implementation phase, the invention may be embodied by modifying constituent elements thereof without departing from the gist thereof. Also, various modifications of the invention may be made by appropriate combinations of constituent elements disclosed in the foregoing description of the embodiments. For example, some constituent elements may be removed from all the constituent elements described in the foregoing description of the embodiments. Also, constituent elements of different embodiments may be appropriately combined.

Meanwhile, when a toroidal-type continuously variable transmission is assembled, each of constituent parts is assembled to the inside of a casing for accommodating the body of this toroidal-type continuously variable transmission. At that time, in a case where an input side disk unit 150 for use in this toroidal-type continuously variable transmission, which comprises an input shaft 1, a loading cam 7 to be disposed on this input shaft 1, a loading roller 43, a retainer 45, balls 39 of a ball bearing 41, a dish spring 8, balls 17 of a ball spline 6A and a front input-side disk 2A and so on is assembled into the casing for accommodating the body of this toroidal-type continuously variable transmission, it is necessary to collectively assemble a unit, which is obtained by preliminarily and temporarily assembling the input side disk unit 500 therefor to the input shaft 1, into the casing. Otherwise, the constituent parts would be separated from one another and could not be efficiently assembled into the casing.

Figure 13:
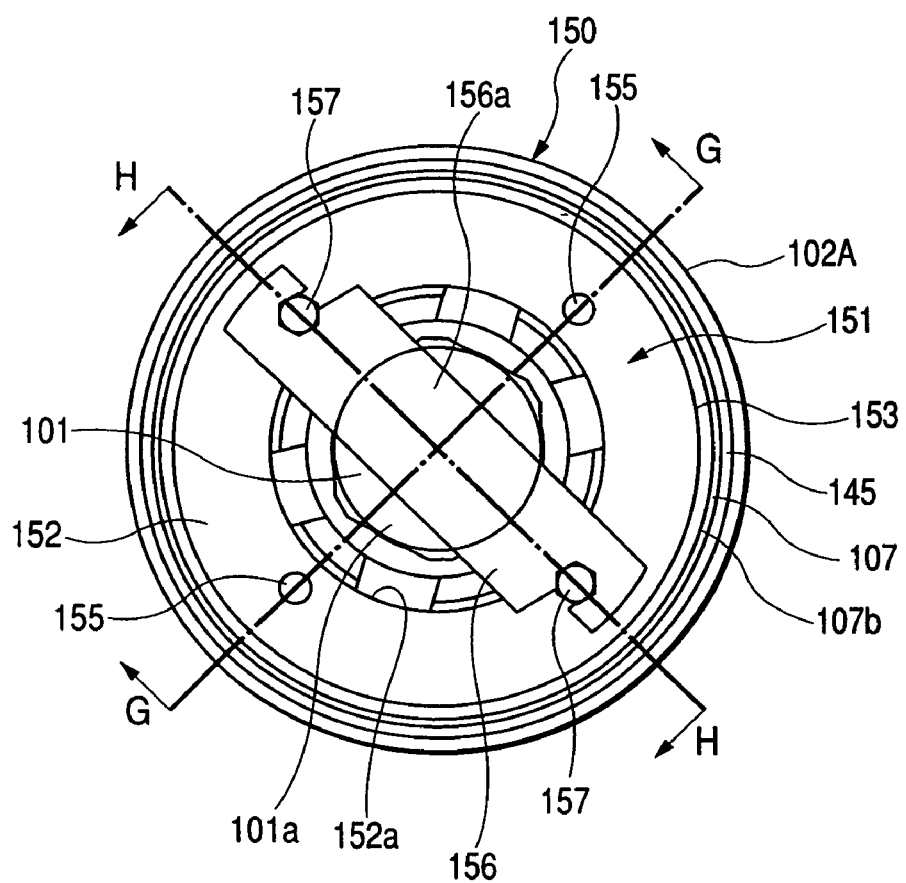
FIG. 13 is a side view illustrating an input side disk unit for use in a related toroidal-type continuously variable transmission.
Figure 14:
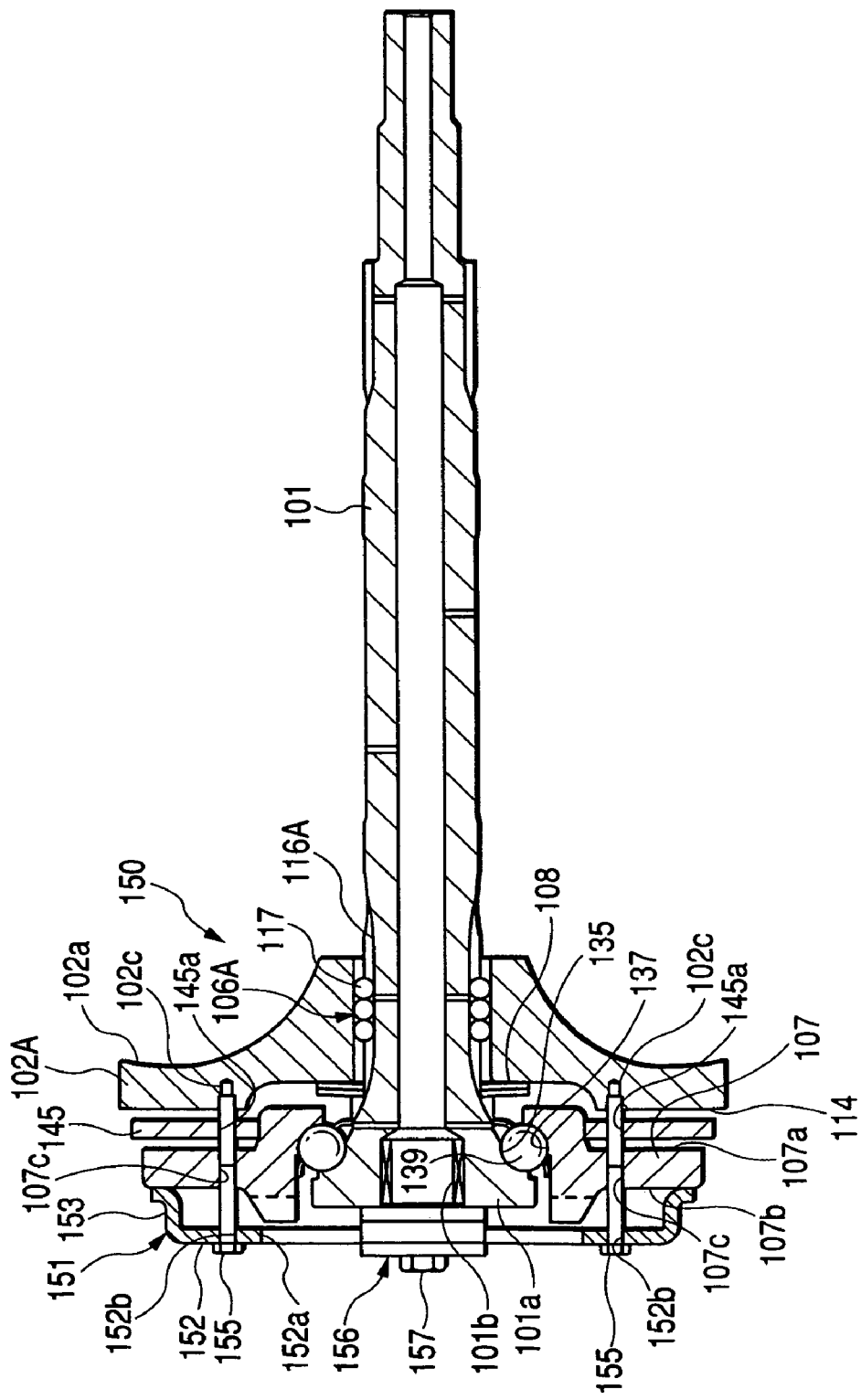
FIG. 14 is a sectional view taken along line G-G of FIG. 13.
Figure 15:
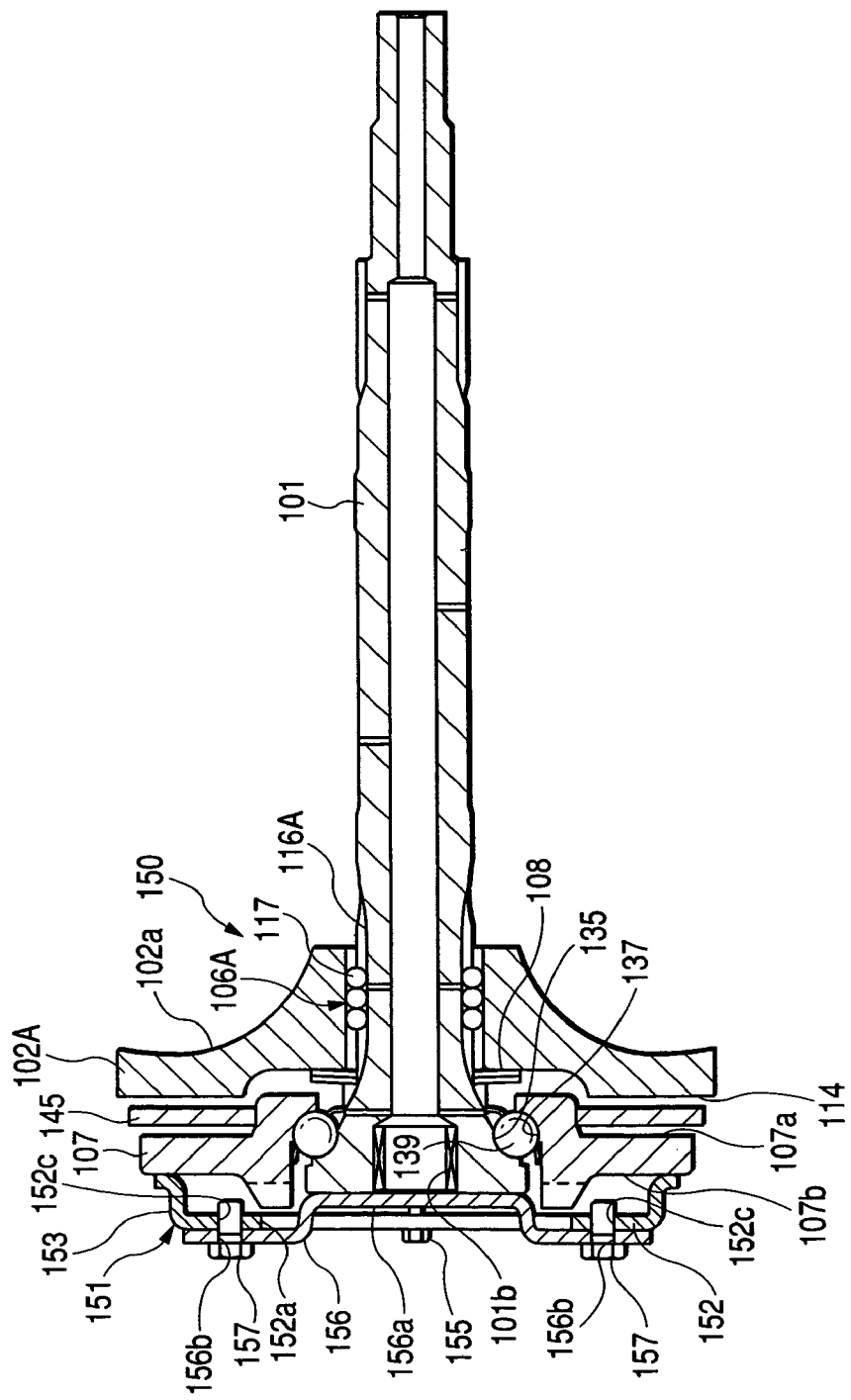
FIG. 15 is a sectional view taken along line H-H of FIG. 13.

Thus, as illustrated in FIGS. 13 to 15, the components of the input side disk unit 150 are temporarily assembled by using a pressing jig 151, which is placed at the side of an outer surface 107b of the loading cam 107, and a plate-like positioning jig 156, which is fixed to the pressing jig 151.

As shown in FIGS. 13 and 14, the pressing jig 151 comprises a disk-like plate portion 152 having a circular hole 152a provided in the central portion thereof, and also comprises a leg portion 153 formed by folding the entire outer peripheral part of this plate portion 152 toward the outer surface of the loading cam 107. Then, in a state in which the positioning of the loading cam 107, an input side disk 102A, and a loading roller 143 is performed in such a way as to minimize a pressing force generated thereamong, two bolts 155, 155 are passed through the through holes 152b, 152b of the plate portion 152, the through holes 107c, 107c of the loading cam 107, and the through holes 145a, 145a of a retainer 145. The input side disk 102A is connected to the pressing jig 151 by screwing end portions of the bolts 155, 155 into female threads 102c, 102c formed in the outer surface of the input side disk 102A. Thus, the input shaft 101, the loading cam 107, the retainer 145, and the input side disk 102A are held in an unseparated manner.

As shown in FIG. 15, a cross-sectionally U-shaped projection portion 156a protruding toward an end surface at the side of a flange portion 101a of the input shaft 101 is formed at a central portion of the positioning jig 156. Through holes 156b, 156b, through which two bolts 157, 157 are respectively passed, are formed in both end portions of the positioning jig 156. Also, end portions of the bolts 157, 157 are screwed into female threads 152c, 152c formed in the plate portion 152 of the pressing jig 151. Consequently, the positioning jig 156 is fixed to the outer surface of the plate portion 152 of the pressing jig 151. During this state, the projection portion 156a of the positioning jig 156 is pressed against an end surface at the side of the flange portion 101a of the input shaft 101 trough the circular hole 152a of the plate portion 152 of the pressing jig 151. Consequently, the positioning in the axial direction of the input shaft 101 is achieved.

Meanwhile, the input side disk unit 150 is assembled into the casing 150 in a state in which the jigs 151 and 156 are assembled thereto. Thereafter, the jigs 151 and 156 are detached in the casing. At that time, foreign materials, such as abrasion powder and cut powder, are generated when the bolts 155, 155, 157, 157 are detached, because a load is applied from the dish spring 108 on the bolts 155, 155, 157, 157, so that the female threads 102c, 102c, 152c, 152c are grounded. When such foreign materials fall in the casing, biting of the foreign materials into the space between the rolling surfaces, such as that between the input side disk and the power roller and that between an output side disk and the power roller, is caused. Thus, there is a fear of reduction in the life of the toroidal-type continuously variable transmission.

Figure 16:
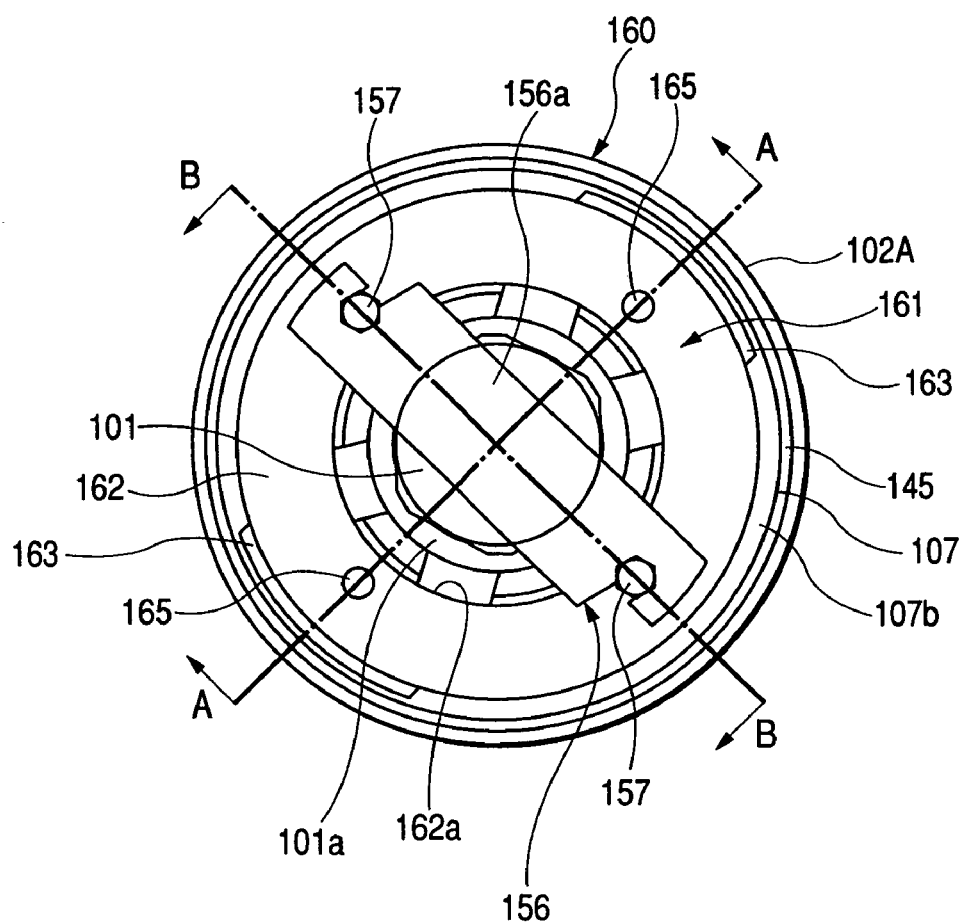
FIG. 16 is a side view illustrating an input side disk unit for use in a toroidal-type continuously variable transmission.
Figure 17:
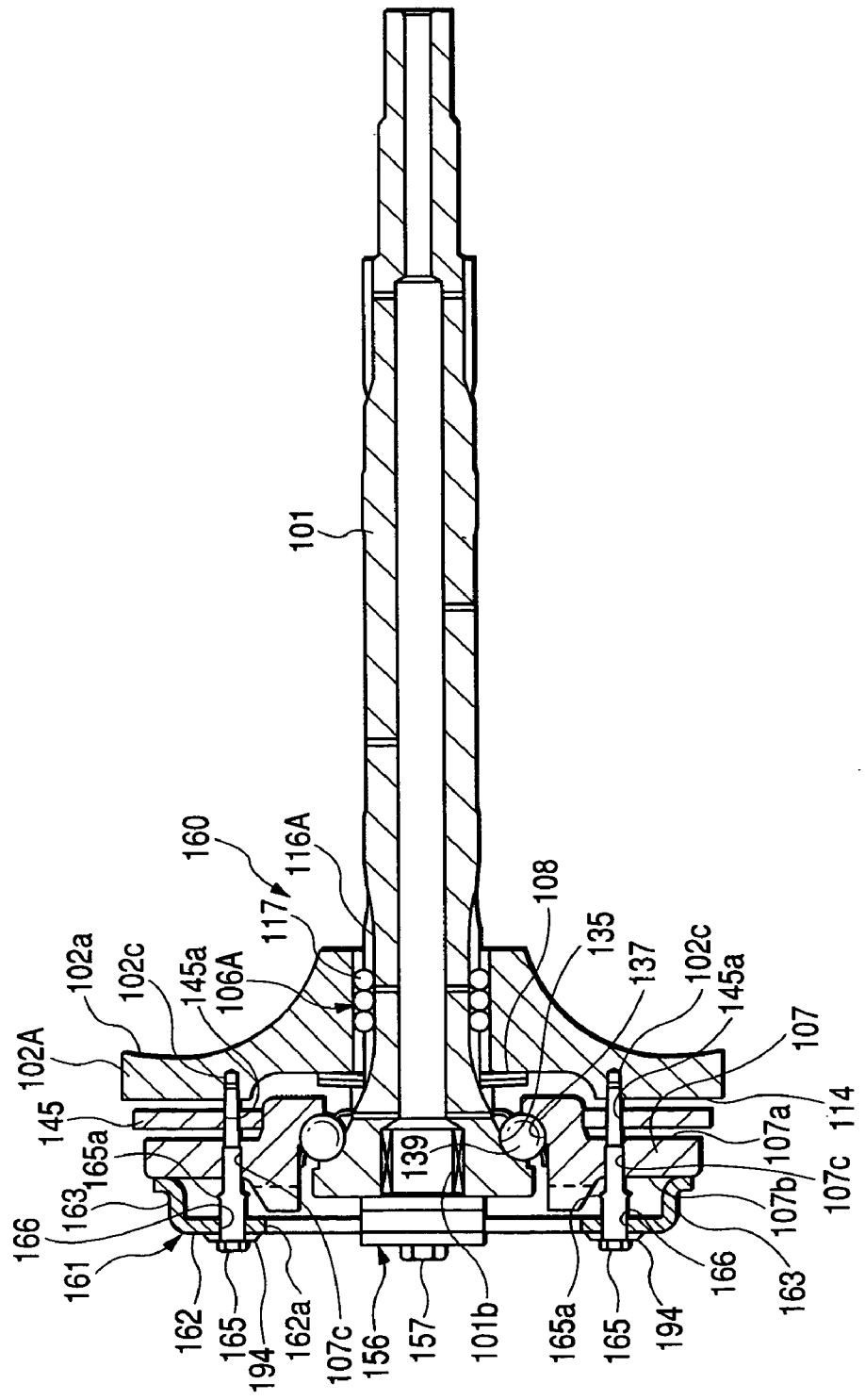
FIG. 17 is a sectional view taken along line A-A of FIG. 16.
Figure 18:
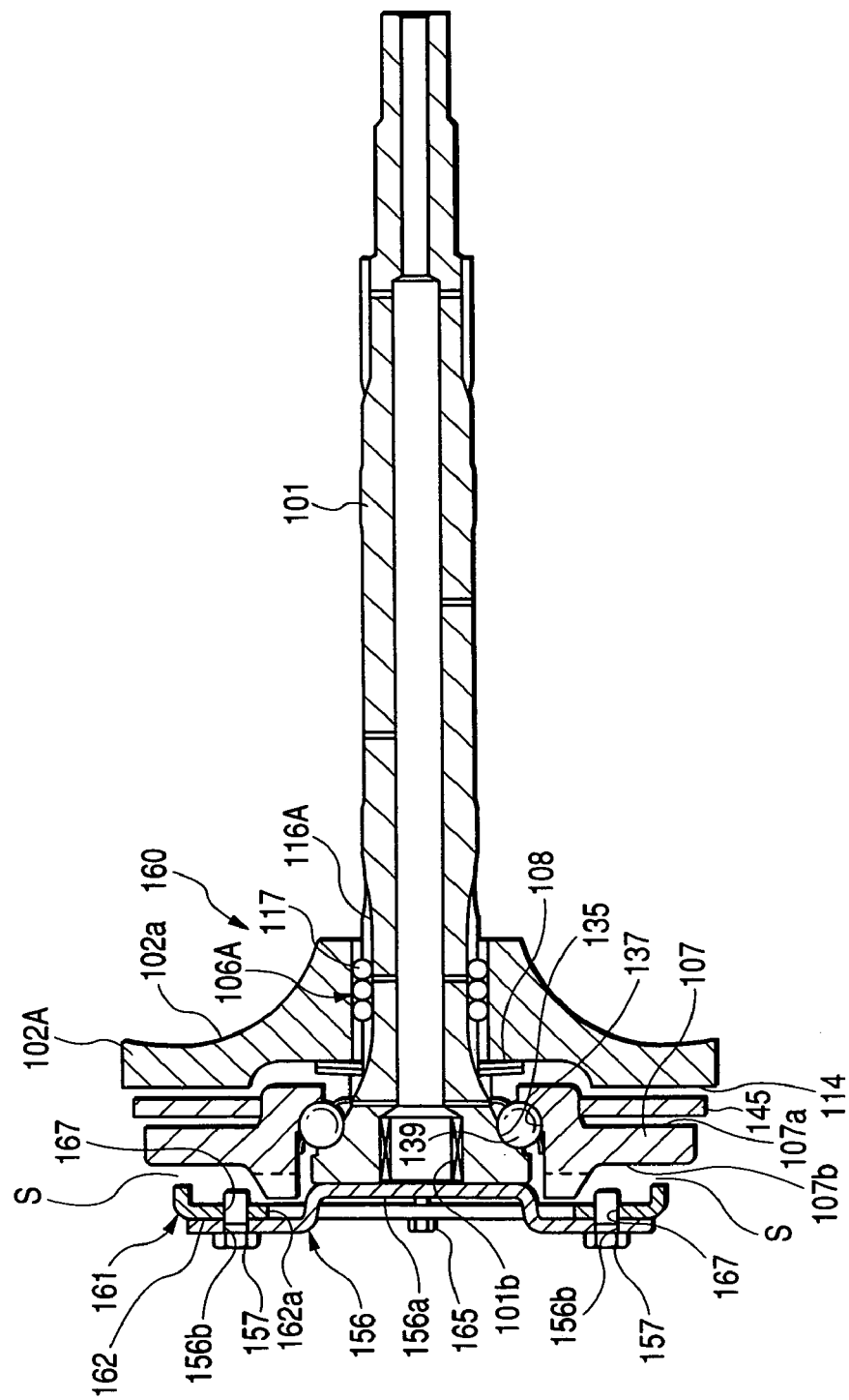
FIG. 18 is a sectional view taken along line B-B of FIG. 16.

Thus, as illustrated in FIGS. 16 to 18, the input side disk unit 160 for use in the toroidal-type continuously variable transmission has a pressing jig 161 and a positioning jig 156 fixed to this pressing jig 161 so as to prevent this reduction in the life of the toroidal-type continuously variable transmission.

As shown in FIGS. 16 and 17, the pressing jig 161 comprises a disk-like plate portion 162 having a circular hole 162a formed in the central portion thereof, and also comprises a pair of leg portions 163, 163 formed in such a manner as to extend from the outer peripheral edge part of this plate portion 162 toward the outer surface 107b of the loading cam 107.

As shown in FIG. 17, end parts of the leg portions 163, 163 are press-contacted with the outer surface 107b of the loading cam 107. Also, as shown in FIG. 17, the leg portions 163, 163 are formed in such a manner as to be spaced in a circumferential direction of the plate portion 162 and as to face each other. Consequently, as shown in FIG. 18, a space S is formed between the leg portions 163, 163.

Two through holes 166, 166, through which bolts 165 and 165 are passed, are formed in the vicinity of the leg portions 163, 163, respectively. Slip-off preventing portions 165a, 165a projecting outwardly are respectively formed at middle portions of the outer circumferential surfaces of bolts 165, 165 thereby to prevent the bolts 165, 165 from slipping off from the through holes 166, 166 of the plate portion 162. Each of flat washers 194, 194 is interposed between the plate portion 162 and an associated one of head portions of the bolts 165, 165 so as to prevent the plate portion 162 from being damaged by the friction between the plate portion 162 and each of the head portions of the bolts 165, 165 when the bolts 165, 165 are fastened.

Also, female threads 167, 167, into which the end portions of the bolts 157, 157 for fixing the positioning jig 156 to the plate portion 162 are screwed, are respectively formed at places, each of which is spaced 90 degrees in the circumferential direction from an associated one of the through holes 166, 166, in the plate portion 162.

The bolts 165, 165 of the pressing jig 161 are passed through the through holes 107c, 107c of the loading cam 107 and through the through holes 145a, 145a of the retainer 145 in a state in which the groove portion of a drive-side cam surface 107a of the loading cam 107 and the groove portion of a drive-side cam surface 114 of the input side disk 102A are opposed to each other and in which the loading roller 143 is placed between these groove portions. Also, the end portions of the bolts 165 and 165 are screwed into the female threads 102c, 102c of the input side disk 102A, respectively. Thus, the input side disk 102A is connected to the pressing jig 161. Consequently, the input shaft 101, the loading cam 107, the retainer 145, and the input side disk 102A are held in an unseparated manner.

When the positioning jig 156 is fixed to the plate portion 162, the end portions of the bolts 157, 157 are screwed into the female threads 167, 167 of the plate portion 162 during a state in which the dish spring (a preload generating member) 108 is compressed by pushing the input shaft 101. Thus, the bolts 157, 157 are screwed to the female threads 167, 167 without being subjected to a load provided by the dish spring 108.

In the input side disk unit 160, which is constructed in this manner, for use in a toroidal-type continuously variable transmission, the leg portions 163, 163 of the pressing jig 161 are formed at predetermined intervals in the circumferential direction of the plate portion 162. Thus, even when foreign substances, such as abrasion powder and cut powder produced when the bolts 165, 165 are screwed into or unscrewed from the female threads 102c, 102c of the input side disk 102A or when the bolts 157, 157 are respectively unscrewed from the female threads 167, 167 of the plate portion 162, are accumulated between the loading cam 107 and the pressing jig 161, the foreign substances can be washed out of the spaces S between the leg portions 163, 163. Thus, an occurrence of the biting of the foreign materials into the space between the rolling surfaces, such as that between the input side disk 102A and the power roller 111A or that between the output side disk 103A and the power roller 111A, can be prevented. Consequently, the life of the toroidal-type continuously variable transmission can be prevented from being reduced.

FIGS. 19 to 22 are views illustrating another input side disk unit for use in a troidal continuously variable transmission, which is subjected to countermeasures.

Figure 19:
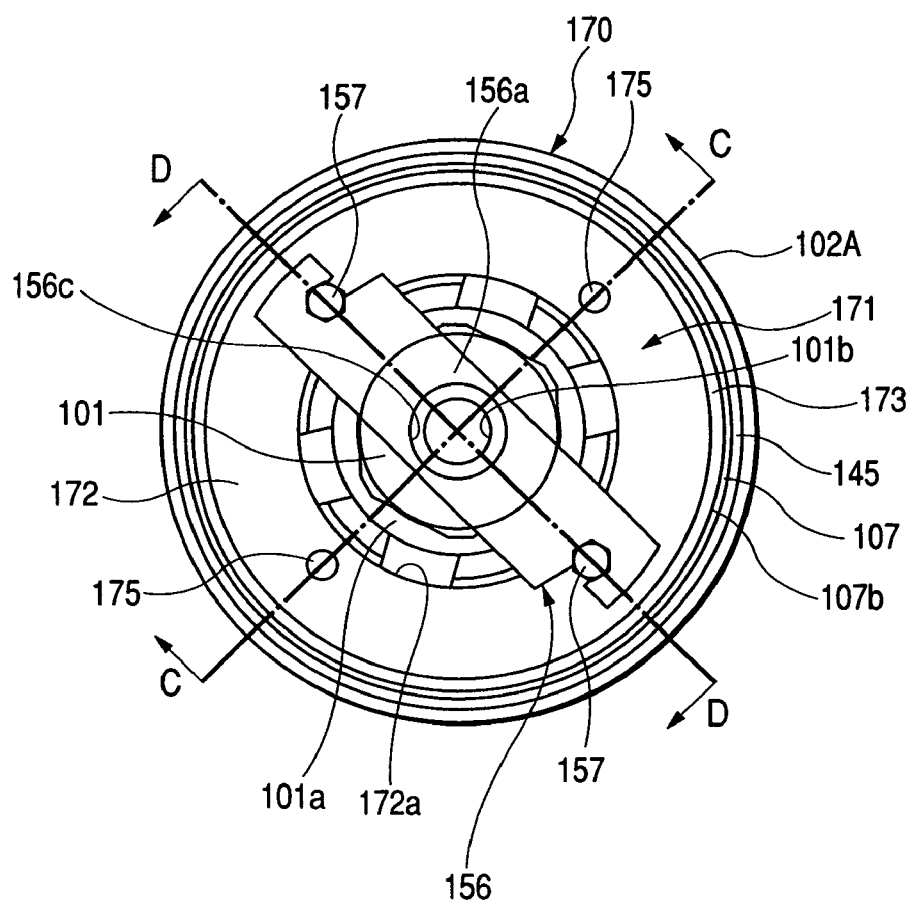
FIG. 19 is a side view illustrating another input side disk unit for use in a toroidal-type continuously variable transmission.
Figure 20:
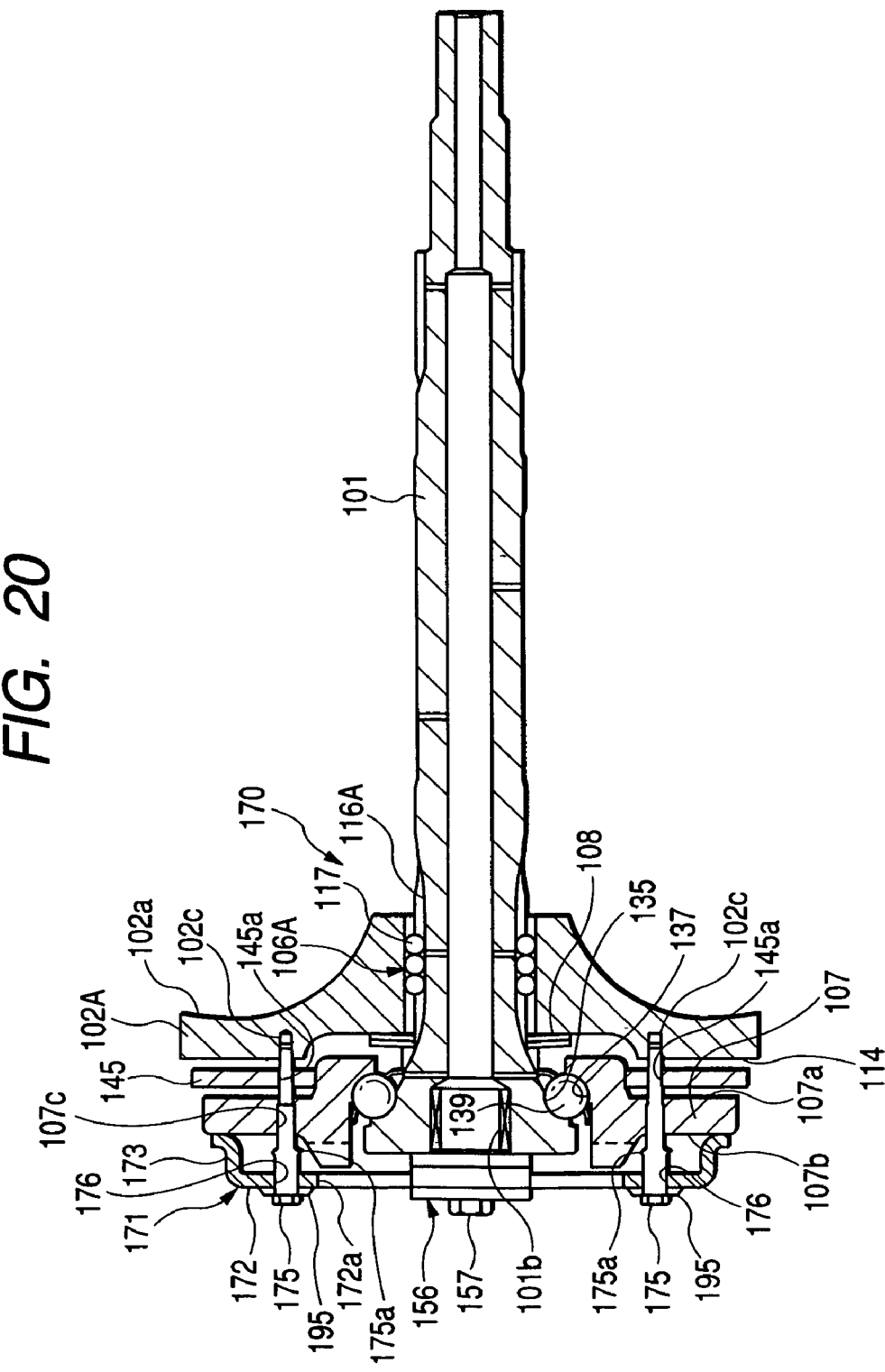
FIG. 20 is a sectional view taken along line C-C of FIG. 19.
Figure 21:
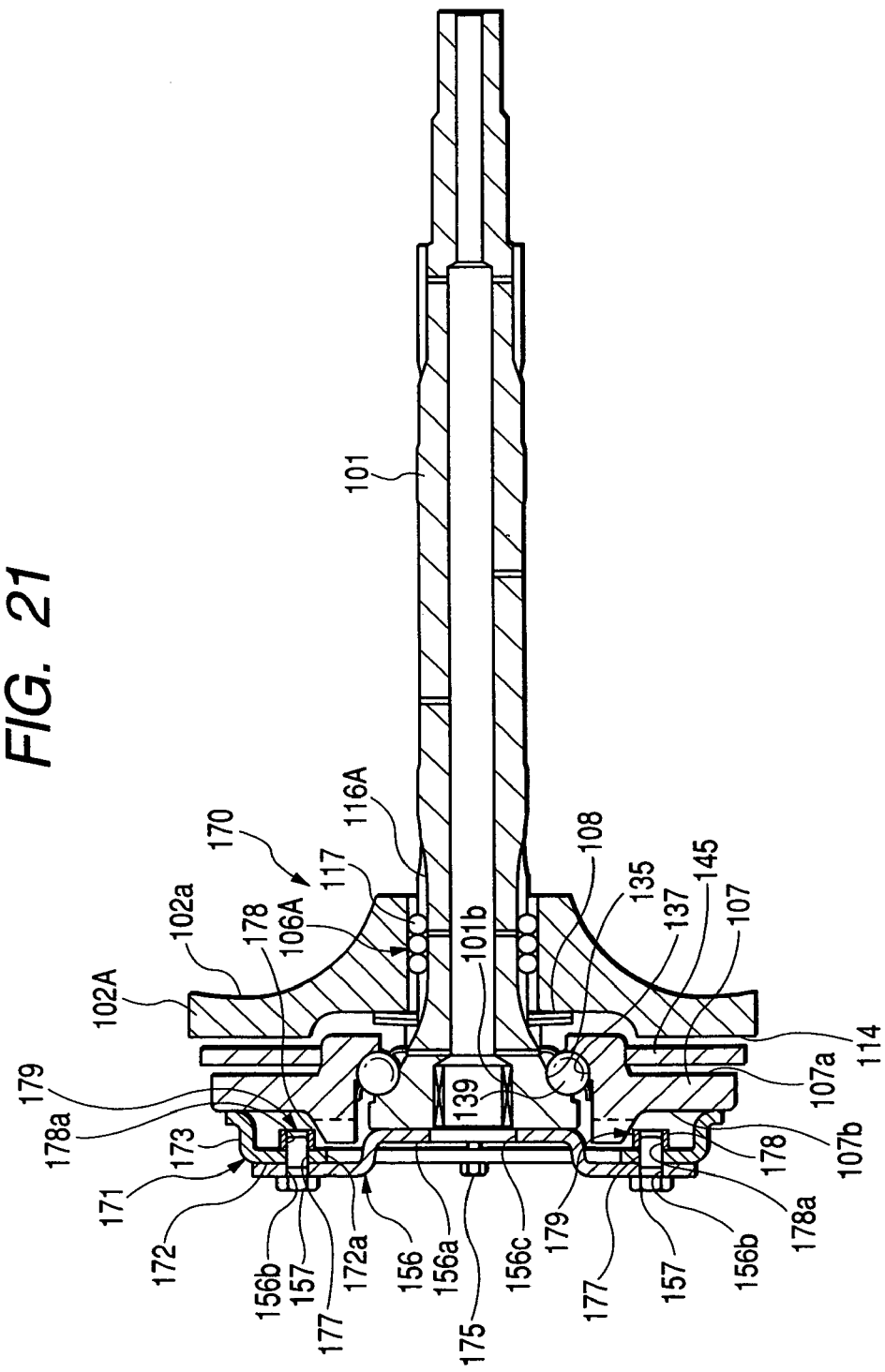
FIG. 21 is a sectional view taken along line D-D of FIG. 19.

As shown in FIGS. 19 to 21, an input side disk unit 170 for use in a troidal continuously variable transmission has a pressing jig 171 and a plate-like positioning jig 156 fixed to this pressing jig 171.

As shown in FIGS. 19 and 20, the pressing jig 171 comprises a disk-like plate portion 172 having a circular hole 172a provided in the central portion thereof, and also comprises a leg portion 173 formed by folding the entire outer peripheral part of this plate portion 172 toward the outer surface of the loading cam 107.

As shown in FIG. 20, two through holes 176, 176, through which bolts 175, 175 penetrate, are formed in the plate portion 172 in such a way as to be opposed to each other. Slip-off preventing portions 175a, 175a projecting outwardly are respectively formed at middle portions of the outer circumferential surfaces of the bolts 175, 175 thereby to prevent the bolts 175, 175 from slipping off from the through holes 176, 176 of the plate portion 172. Each of flat washers 195, 195 is interposed between the plate portion 172 and an associated one of head portions of the bolts 175, 175 so as to prevent the plate portion 172 from being damaged by the friction between the plate portion 172 and each of the head portions of the bolts 175, 175 when the bolts 175, 175 are fastened.

End parts of the leg portions 173, 173 are press-contacted with the outer surface 107b of the loading cam 107.

Figure 22:
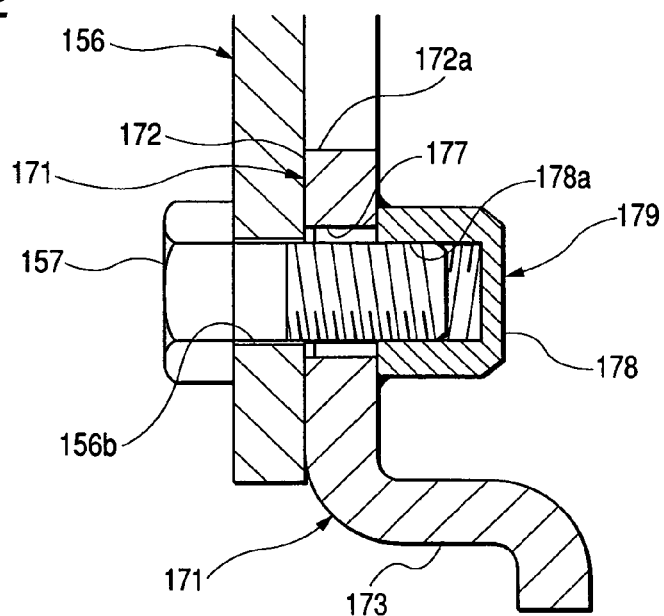
FIG. 22 is an enlarged sectional view illustrating a female thread portion of a pressing jig shown in FIG. 20.

As shown in FIGS. 21 and 22, through holes 177, 177, through which bolts 157, 157 for fixing the positioning jig 156 to the outer surface of the plate portion 172 are passed, are respectively formed at places, each of which is spaced 90 degrees in the circumferential direction from an associated one of the through holes 176, 176, in the plate portion 172. Also, bottomed cylindrical accommodating portions 178, 178 for accommodating front edge portions of bolts 157, 157 are fixed to parts, at each of which the through hole 177 is formed, in the inner surface of the plate portion 172 by welding or the like. Female threads 178a, 178a, into which the end portions of the bolts 157, 157 are screwed, are respectively formed in the inner circumferential surfaces of the accommodating portions 178, 178. Each of female thread portions 179, 179 comprises an associated one of the through holes 177, 177 and an associated one of the accommodating portions 178, 178.

As shown in FIGS. 19 and 21, a through hole 156c, which communicates a shaft hole (the inside) 101b of the input shaft 101 with the outside and is larger in diameter than the shaft hole 101b, is formed in a central part of the projection portion 156a of the positioning jig 156.

In the input side disk unit 170 for use in a toroidal-type continuously variable transmission, which is constructed in such a manner, female thread portions 179, 179 respectively having bottomed cylindrical accommodating portions 178, 178, each of which accommodates an associated one of the end portions of the bolts 157, 157, are formed in the plate portion 172 of the pressing jig 171. Thus, foreign materials, which are generated when the bolts 157, 157 are fastened to or detached from the female thread portions 179, 179, remain in the accommodating portions 178, 178 of the female thread portions 179, 179. Consequently, foreign materials can be prevented from falling in the casing. Therefore, an occurrence of the biting of the foreign materials into the space between the rolling surfaces, such as that between the input side disk 102A and the power roller 111A or that between the output side disk 103A and the power roller 111A, can be prevented. Consequently, the life of the toroidal-type continuously variable transmission can be prevented from being reduced.

Because the through hole 156c communicating the shaft hole 101b of the input shaft 101 with the outside is formed in the positioning jig 156, the shaft hole 101b of the input shaft 101 can be washed through the through hole 156c of the positioning jig 156 during a state wherein the pressing jig 171, to which the pressing jig 156 is fixed, is attached to the input side disk 102A. Consequently, foreign materials can be prevented from being accumulated in the shaft hole 101b of the input shaft 101.

FIGS. 23 to 26 are views illustrating still another input side disk unit for use in a troidal continuously variable transmission, which is subjected to countermeasures. Incidentally, in FIGS. 23 to 26, the same constituent elements as those shown in FIGS. 16 to 18 are designated by the same reference characters. Thus, the description thereof is simplified.

Figure 23:
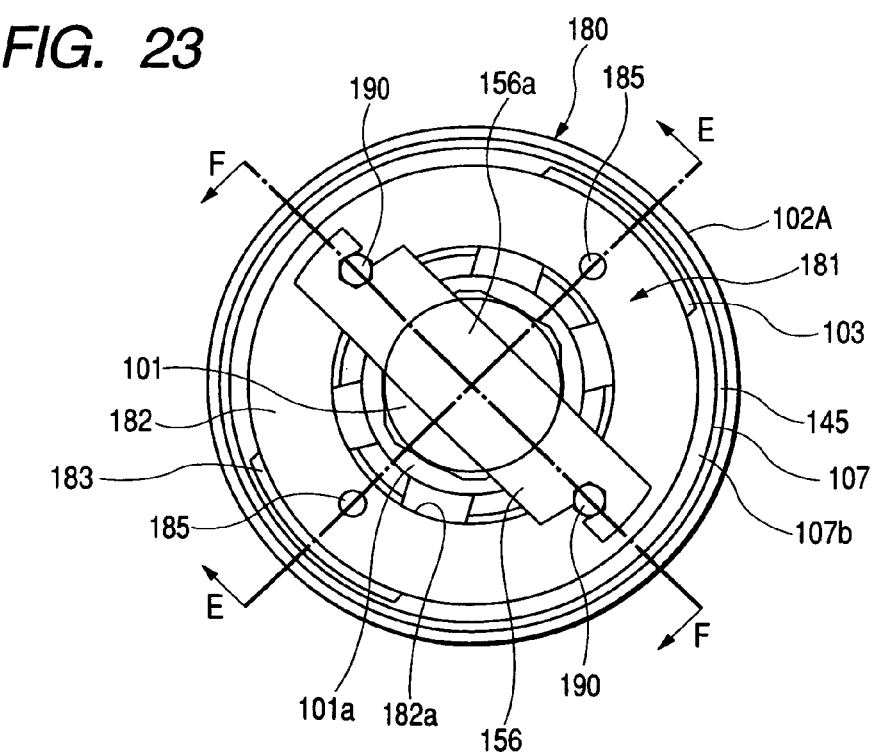
FIG. 23 is a side view illustrating another input side disk unit for use in a toroidal-type continuously variable transmission.
Figure 24:
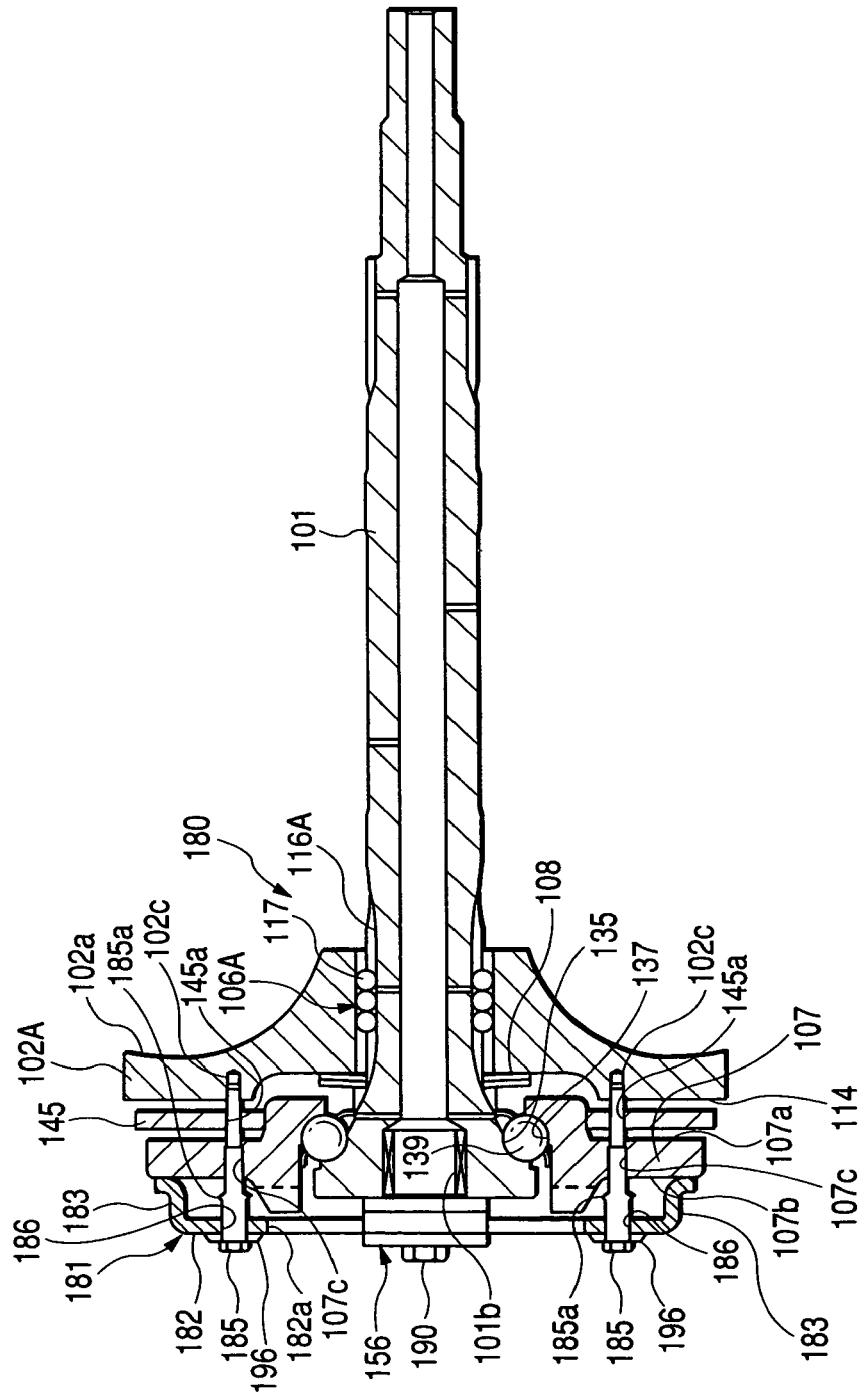
FIG. 24 is a sectional view taken along line E-E of FIG. 23.

As shown in FIGS. 23 to 24, an input side disk unit 180 for use in a troidal continuously variable transmission has a pressing jig 181 and a plate-like positioning jig 156 fixed to this pressing jig 181.

As shown in FIGS. 23 and 24, the pressing jig 181 comprises a disk-like plate portion 182 having a circular hole 182a formed in the central portion thereof, and also comprises a pair of leg portions 183, 183 formed in such a manner as to extend from the outer peripheral edge part of this plate portion 182 toward the outer surface 107b of the loading cam 107.

As shown in FIG. 23, end parts of the leg portions 183, 183 are press-contacted with the outer surface 107b of the loading cam 107. Also, as shown in FIG. 24, the leg portions 183, 183 are formed in such a manner as to be spaced in a circumferential direction of the plate portion 182 and as to face each other. Consequently, as shown in FIG. 24, a space S is formed between the leg portions 183, 183.

Two through holes 186, 186, through which bolts 185 and 185 are passed, are formed in the vicinity of the leg portions 183, 183 of plate portions 182, respectively. Slip-off preventing portions 185a, 185a projecting outwardly are respectively formed at middle portions of the outer circumferential surfaces of the bolts 185, 185 thereby to prevent the bolts 185, 185 from slipping off from the through holes 186, 186 of the plate portion 182. Each of flat washers 196, 196 is interposed between the plate portion 182 and an associated one of head portions of the bolts 185, 185 so as to prevent the plate portion 182 from being damaged by the friction between the plate portion 182 and each of the head portions of the bolts 185, 185 when the bolts 185, 185 are fastened.

Figure 25:
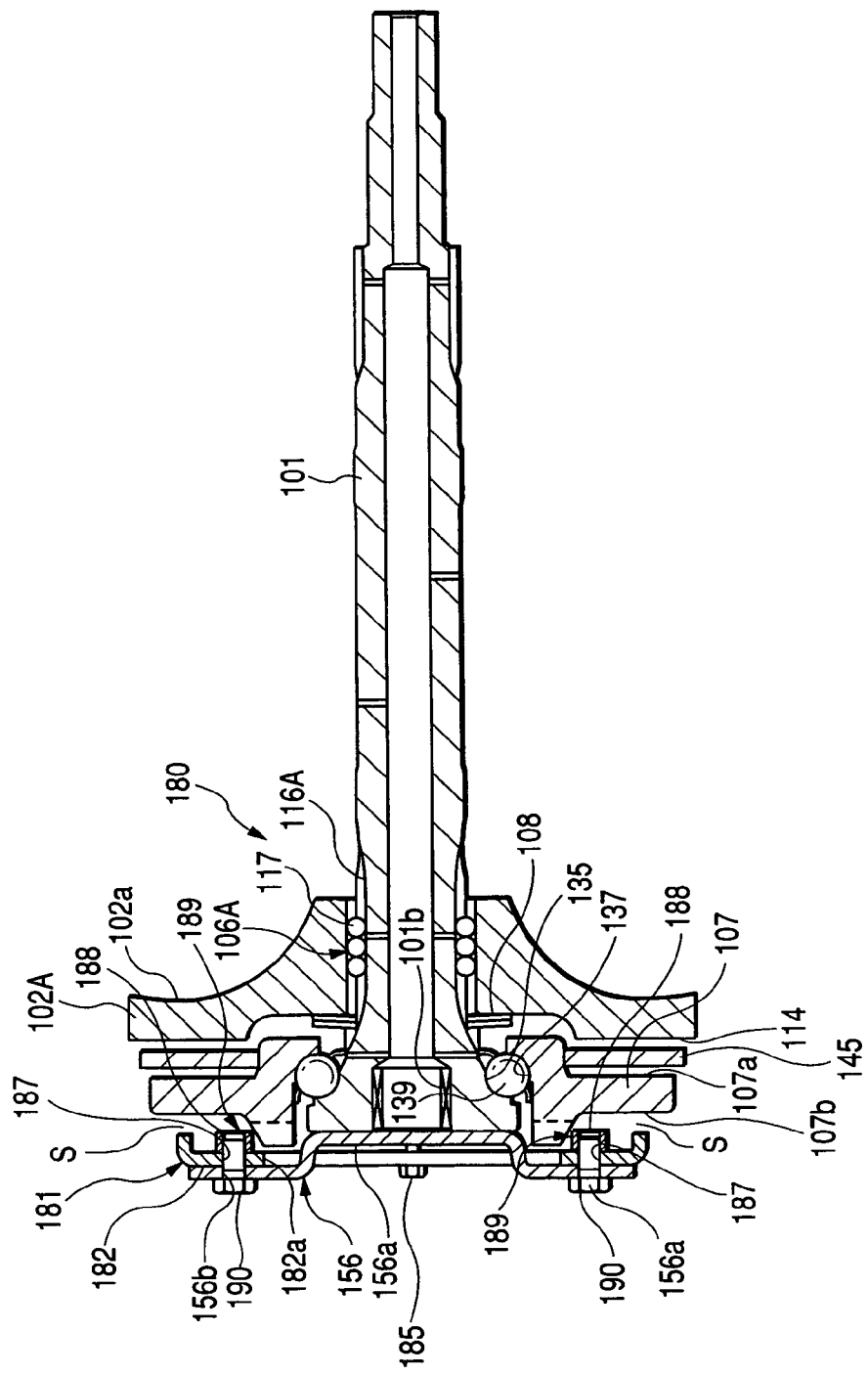
FIG. 25 is a sectional view taken along line F-F of FIG. 23.
Figure 26:
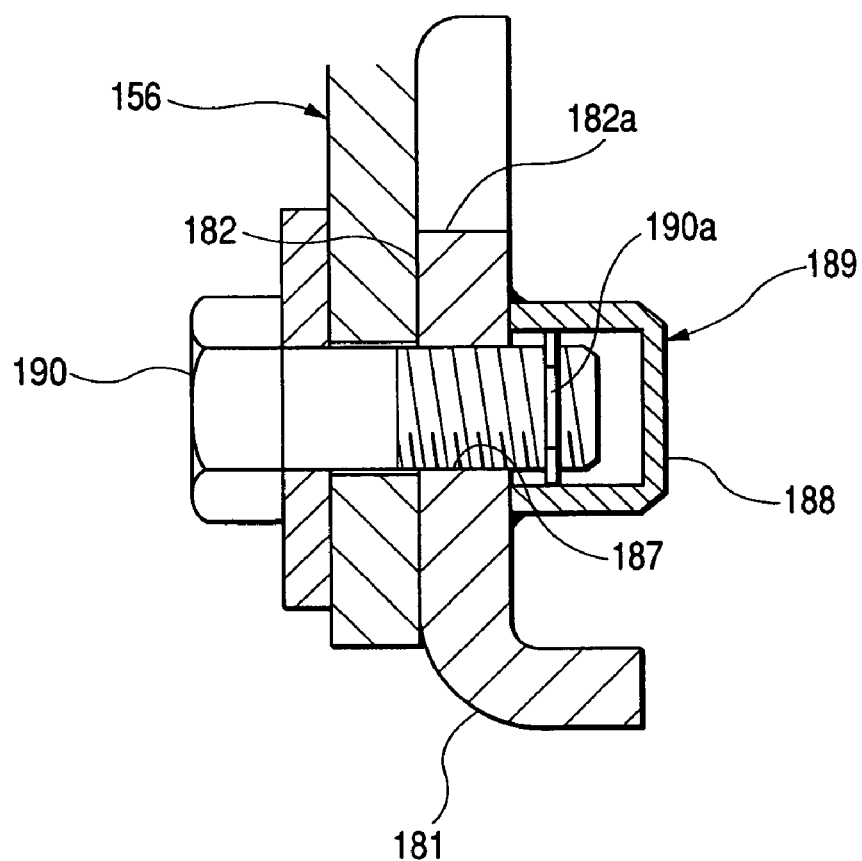
FIG. 26 is an enlarged sectional view illustrating a female thread portion of a pressing jig shown in FIG. 24.

Also, as shown in FIGS. 25 and 26, female threads 187, 187, into which the end portions of the bolts 190, 190 for fixing the positioning jig 156 to the plate portion 182 are screwed, are respectively formed at places, each of which is spaced 90 degrees in the circumferential direction from an associated one of the through holes 186, 186, in the plate portion 182. Bottomed cylindrical accommodating portions 188, 188 for accommodating front edge portions of the bolts 190, 190 are fixed to parts, at each of which the through hole 187 is formed, in the inner surface of the plate portion 182 by welding or the like. Each of female thread portions 189, 189 comprises an associated one of the through holes 187, 187 and an associated one of the accommodating portions 188, 188.

As shown in FIG. 26, nearly annular retaining rings (slip-off preventing portions) 190a, 190a for preventing the bolts 190, 190 from pulling out from the respective accommodating portions 188, 188 are provided on the outer peripheral surfaces of end portions of the bolts 190, 190.

In the input side disk unit 180 for use in a toroidal-type continuously variable transmission, which is constructed in such a manner, the retaining rings 190a, 190a are provided on the outer peripheral surfaces of the end portions of the bolts 190, 190, respectively. Thus, even when the bolts 190, 190 are unscrewed, the retaining rings 190a, 190a abut against the inner surface of the plate portion 182. Thus, the end portions of the bolts 190 can be prevented from slipping off the accommodating portion 189. Consequently, foreign materials accumulated in the accommodating portions 188, 188 can be prevented from going out of the accommodating portions 188, 188 and from falling into the casing.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A toroidal-type continuously variable transmission, comprising:

an input shaft;

an input disk and an output disk, which are supported mutually concentrically with said input shaft and mutually independently rotatably;

a power roller sandwiched between said input disk and said output disk;

a power roller bearing for rotatably supporting said power roller;

a seal member provided on an outer peripheral surface of the power roller bearing;

an oil passage for leading lubricating oil to said power roller bearing;

a foreign substance trapping member provided in the oil passage; and at least one pair of trunnions each having a pivot shaft disposed at a position perpendicular to axes of said input disk and said output disk and each adapted to tiltedly rotate around said pivot shaft, wherein the trapping member comprises at least one of a mesh filter and a magnet member provided in said oil passages, wherein each of the trunnions has a shaft at a bottom thereof, and the trapping member is disposed in the shaft provided at the bottom of each of the trunnions.

2. The toroidal-type continuously variable transmission according to claim 1, further comprising:

a seal member provided on an outer peripheral surface of said power roller bearing.

3. The toroidal-type continuously variable transmission according to claim 1, wherein said power roller bearing has an inner ring and an outer ring, and wherein said trapping member is disposed between said inner ring and said outer ring.

4. A toroidal-type continuously variable transmission, in which lubricating oil is supplied from an oil pump having a line filter, comprising:

an input shaft;
an input disk and an output disk, which are supported mutually concentrically with said input shaft and mutually independently rotatably;
at lest one pair of trunnions each having a pivot shaft disposed at a position perpendicular to directions of center axes of said input disk and said output disk and each adapted to tiltedly rotate around said pivot shaft;
a power roller sandwiched between said input disk and said output disk;
a power roller bearing for rotatably supporting said power roller;
a seal member provided on an outer peripheral surface of the power roller bearing;
a lubricating oil passage for supplying lubricating oil from said line filter to said power roller bearing; and
a foreign substance trapping member provided in the oil passage, wherein the trapping member comprises at least one of a mesh filter and a magnet member provided in said oil passage,
wherein each of the trunnions has a shaft at a bottom thereof, and the trapping member is disposed in the shaft provided at the bottom of each of the trunnions.

5. The toroidal-type continuously variable transmission according to claim 4, further comprising:
a seal member provided on an outer peripheral surface of said power roller bearing.

6. The toroidal-type continuously variable transmission according to claim 4, wherein each of said trunnions has a shaft at a bottom thereof, and wherein said trapping member is disposed in said shaft provided at the bottom of each of said trunnions.

7. The toroidal-type continuously variable transmission according to claim 4, further comprising:
a displacement shaft projecting from an inner surface of each of said trunnions, wherein said oil passage include an oil hole provided in the displacement shaft, and
wherein said power roller bearing has an inner ring and an outer ring, said outer ring and said displacement shaft are integrally provided, and said trapping member is disposed in the oil hole of each of said displacement shafts.

8. The toroidal-type continuously variable transmission according to claim 7, comprising:
a thrust bearing disposed between said outer ring of said power roller bearing and each of said trunnions; and
a seal member, provided on an outer peripheral portion of said thrust bearing.

9. The toroidal-type continuously variable transmission according to claim 4, further comprising:
a valve body including an upper valve body and a lower valve body, provided under said input disk and said output disk, wherein an oil passage for supplying lubricating oil to said power roller bearing is provided in said lower valve body, and wherein the trapping member is provided in said oil passage of said lower valve body.

10. The toroidal-type continuously variable transmission according to claim 4, wherein each of said trunnions has a drive rod provided at a bottom thereof, wherein an oil passage for supplying lubricating oil to said power roller bearing is provided in each of said drive rods, and wherein the trapping member is provided in said oil passage of each of said drive rods.

11. The toroidal-type continuously variable transmission according to claim 4, wherein each of said trunnions has an oil passage for supplying lubricating oil to said power roller bearing, and wherein a foreign substance trap member is provided in said oil passage of each of said trunnions, wherein said trap member comprises at least one of a mesh filter and a magnetic member.

12. The toroidal-type continuously variable transmission according to claim 4, further comprising:
a displacement shaft projecting from an inner surface of each of said trunnions, wherein the oil passage includes a cavity portion provided in said displacement shaft, and
wherein a foreign substance trap member is provided in said cavity portion of said displacement shaft, and wherein said trap member comprises at least one of a mesh filter and a magnetic member.

13. A toroidal-type continuously variable transmission, comprising:
an input shaft;
an input disk and an output disk, which are supported mutually concentrically with said input shaft and mutually independently rotatably;
a power roller sandwiched between said input disk and said output disk;
a power roller bearing for rotatably supporting said power roller;
a seal member provided on an outer peripheral surface of the power roller bearing;
an oil passage means for leading lubricating oil to said power roller bearing; and
a trapping means for trapping a foreign substance in the oil passage means; and
at least one pair of trunnions each having a pivot shaft disposed at a position perpendicular to axes of said input disk and said output disk and each adapted to tiltedly rotate around said pivot shaft,
wherein each of the trunnions has a shaft at a bottom thereof, and the trapping member is disposed in the shaft provided at the bottom of each of the trunnions.

14. The toroidal-type continuously variable transmission according to claim 13, wherein the trapping means comprises at least one of a mesh filter and a magnet member.

15. A toroidal-type continuously variable transmission, in which lubricating oil is supplied from an oil pump having a line filter, comprising:
an input shaft;
an input disk and an output disk, which are supported mutually concentrically with said input shaft and mutually independently rotatably;
at lest one pair of trunnions each having a pivot shaft disposed at a position perpendicular to directions of center axes of said input disk and said output disk and each adapted to tiltedly rotate around said pivot shaft;
a power roller sandwiched between said input disk and said output disk;
a power roller bearing for rotatably supporting said power roller;
a seal member provided on an outer peripheral surface of the power roller bearing;
a lubricating oil supplying means for supplying lubricating oil from said line filter to said power roller bearing; and
a trapping means provided in the oil supplying means for trapping a foreign substance
wherein each of the trunnions has a shaft at a bottom thereof, and the trapping member is disposed in the shaft provided at the bottom of each of the trunnions.

16. The toroidal-type continuously variable transmission according to claim 15, wherein the trapping means comprises at least one of a mesh filter and a magnet member.

* * * * *